(12) United States Patent
Kang et al.

(10) Patent No.: US 12,177,373 B2
(45) Date of Patent: Dec. 24, 2024

(54) ELECTRONIC DEVICE INCLUDING UNDER DISPLAY CAMERA

(71) Applicant: SAMSUNG ELECTRONICS CO., LTD., Suwon-si (KR)

(72) Inventors: Inkoo Kang, Suwon-si (KR); Woojhon Choi, Suwon-si (KR); Sungoh Kim, Suwon-si (KR); Kihuk Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 232 days.

(21) Appl. No.: 17/968,806

(22) Filed: Oct. 19, 2022

(65) Prior Publication Data

US 2023/0216943 A1 Jul. 6, 2023

Related U.S. Application Data

(63) Continuation of application No. PCT/KR2022/014993, filed on Oct. 5, 2022.

(30) Foreign Application Priority Data

Dec. 31, 2021 (KR) .................. 10-2021-0194379

(51) Int. Cl.
*G02B 5/20* (2006.01)
*H04M 1/02* (2006.01)

(52) U.S. Cl.
CPC .......... *H04M 1/0264* (2013.01); *G02B 5/201* (2013.01); *H04M 1/0266* (2013.01); *H04M 2250/52* (2013.01)

(58) Field of Classification Search
CPC .... G02B 5/201; H04M 1/0264; H04M 1/0266
(Continued)

(56) References Cited

U.S. PATENT DOCUMENTS 9,363,493 B2 6/2016 Tanaka
9,870,024 B2 1/2018 Evans, V et al.
(Continued)

FOREIGN PATENT DOCUMENTS

CN 111078170 A 4/2020
KR 10-1723794 B1 4/2017
(Continued)

OTHER PUBLICATIONS

International Search Report mailed Jan. 6, 2023 for PCT/KR2022/014993, citing the above reference(s).

*Primary Examiner* — Christopher M Raabe
(74) *Attorney, Agent, or Firm* — CANTOR COLBURN LLP

(57) ABSTRACT

An electronic device includes a display; a camera module disposed to overlap at least a portion of the display and comprising at least one first image sensor module to generate a first Bayer image processed by a first color filter array and at least one second image sensor module to generate a second Bayer image processed by a second color filter array; and a processor. The first color filter array includes at least one first red pixel, at least one first green pixel, and at least one first blue pixel. The second color filter array includes at least one second red pixel, at least one second green pixel, and at least one second blue pixel. A proportion of the least one second blue pixel in the second color filter array is greater than a proportion of the least one first blue pixel in the first color filter array.

21 Claims, 12 Drawing Sheets

(58) Field of Classification Search
USPC .............................................................. 349/2
See application file for complete search history.

(56) References Cited

U.S. PATENT DOCUMENTS

| | | |
|---|---|---|
| 10,297,645 B2 | 5/2019 | Wacyk |
| 10,432,847 B2 | 10/2019 | Yamajo et al. |
| 2011/0149213 A1 | 6/2011 | Han et al. |
| 2017/0026622 A1 | 1/2017 | Yoon et al. |
| 2021/0149283 A1 | 5/2021 | Yamajo et al. |
| 2021/0152735 A1 | 5/2021 | Zhou et al. |
| 2021/0168282 A1 | 6/2021 | Geng et al. |
| 2021/0383555 A1 | 12/2021 | Shin et al. |
| 2023/0017043 A1* | 1/2023 | Park .................. H01L 27/14683 |

FOREIGN PATENT DOCUMENTS

| | | |
|---|---|---|
| KR | 10-2018-0084544 A | 7/2018 |
| KR | 10-2018-0133777 A | 12/2018 |
| KR | 10-2021-0151316 A | 12/2021 |
| KR | 102619738 B1 | 1/2024 |

\* cited by examiner

ELECTRONIC DEVICE INCLUDING UNDER DISPLAY CAMERA

TECHNICAL FIELD

Various embodiments of the disclosure relate to an electronic device including an under-display camera (UDC).

BACKGROUND ART

An electronic device, for example, a portable electronic device, is released in various sizes according to functions and user preferences, and may include a large-screen touch display for securing wide visibility and operational convenience. The electronic device may include at least one camera. For example, the electronic device may include at least one camera disposed around a display or to overlap with at least a portion of the display.

DISCLOSURE OF INVENTION

Technical Problem

Recently, as a method for expanding a display area of a display in the electronic device, an under-display camera (UDC) technology for disposing a camera under an active area of the display has been studied and developed. The display area of the display of the electronic device including the UDC may include a UDC area overlapping with at least a portion of the UDC and a general area excluding the UDC area. Since the UDC obtains an image by receiving light transmitted through a portion of the display area of the display, the image quality of the UDC may be affected by the light transmittance of the UDC area of the display.

Regarding the transmittance of light input to the UDC through the UDC area of the display, light transmittance in a short wavelength including a blue color may be lower than the light transmittance in remaining wavelengths including a red color and a green color. Accordingly, in a Bayer image (or a Bayer pattern image) that is a raw image obtained by the UDC, noise of a blue component corresponding to the blue color may increase.

Solution to Problem

Various embodiments of the disclosure may provide an electronic device and a method capable of changing a color filter array of a Bayer pattern applied to some image sensor modules among image sensor modules of a UDC, thereby reducing noise of a blue component corresponding to a blue color and improving the quality of an image captured by the UDC.

Technical aspects to be achieved in the disclosure are not limited to the technical aspects mentioned above, and other technical aspects not mentioned will be clearly understood by those skilled in the art from the following description.

An electronic device according to various embodiments includes: a display, a camera module disposed to overlap at least a portion of the display and including at least one first image sensor module to generate a first Bayer image processed by a first color filter array and at least one second image sensor module to generate a second Bayer image processed by a second color filter array, and a processor. The first color filter array includes at least one first red pixel, at least one first green pixel, and at least one first blue pixel, the second color filter array includes at least one second red pixel, at least one second green pixel, and at least one second blue pixel, and a proportion of the least one second blue pixel in the second color filter array may be greater than a proportion of the least one first blue pixel in the first color filter array.

In a method for operating an electronic device according to various embodiments, the electronic device may include a display and a camera module disposed to overlap at least a portion of the display and including at least one first image sensor module and at least one second image sensor module. The method includes activating the at least one first image sensor module and the at least one second image sensor module, based on a request to activate the camera module, and obtaining the first Bayer image through a first color filter array in the first image sensor module and the second Bayer image through a second color filter array in the second image sensor module. The first color filter array includes at least one first red pixel, at least one first green pixel, and at least one first blue pixel, the second color filter array includes at least one second red pixel, at least one second green pixel, and at least one second blue pixel, and a proportion of second blue pixels in the second color filter array is greater than a proportion of first blue pixels in the first color filter array.

In a non-transitory computer-readable recoding medium recording a program to control an operation of an electronic device according to various embodiments, the electronic device includes a display and a camera module disposed to overlap at least a portion of the display and including at least one first image sensor module and at least one second image sensor module. The program causes the electronic device to perform: an operation of activating the at least one first image sensor module and the at least one second image sensor module, based on a request to activate the camera module, and an operation of obtaining the first Bayer image through a first color filter array in the first image sensor module and the second Bayer image through a second color filter array in the second image sensor module. The first color filter array includes at least one first red pixel, at least one first green pixel, and at least one first blue pixel, the second color filter array includes at least one second red pixel, at least one second green pixel, and at least one second blue pixel, and a proportion of second blue pixels in the second color filter array is greater than a proportion of first blue pixels in the first color filter array.

Advantageous Effects of Invention

An electronic device and a method according to various embodiments of the disclosure may change a color filter array of a Bayer pattern applied to some image sensor modules among image sensor modules of a UDC, thereby effectively reducing noise of a blue component corresponding to a blue color and improving the quality of an image captured by the UDC.

In addition, various effects directly or indirectly identified through the disclosure may be provided.

BRIEF DESCRIPTION OF DRAWINGS

Other aspects, features, and advantages according to specific embodiments of the disclosure will become more apparent from the accompanying drawings and corresponding description in connection therewith.

MODE FOR THE INVENTION

Figure 1:
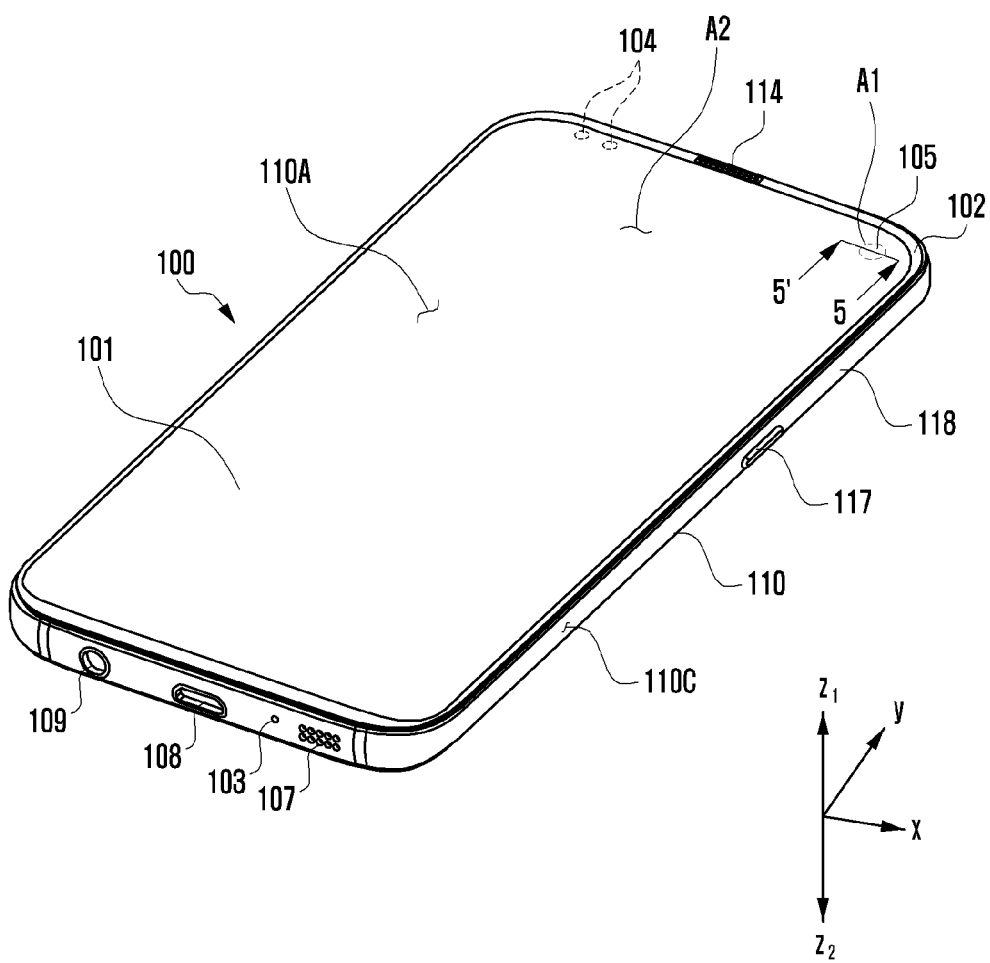
FIG. 1 is a perspective view of a front side of an electronic device according to various embodiments of the disclosure.
Figure 2:
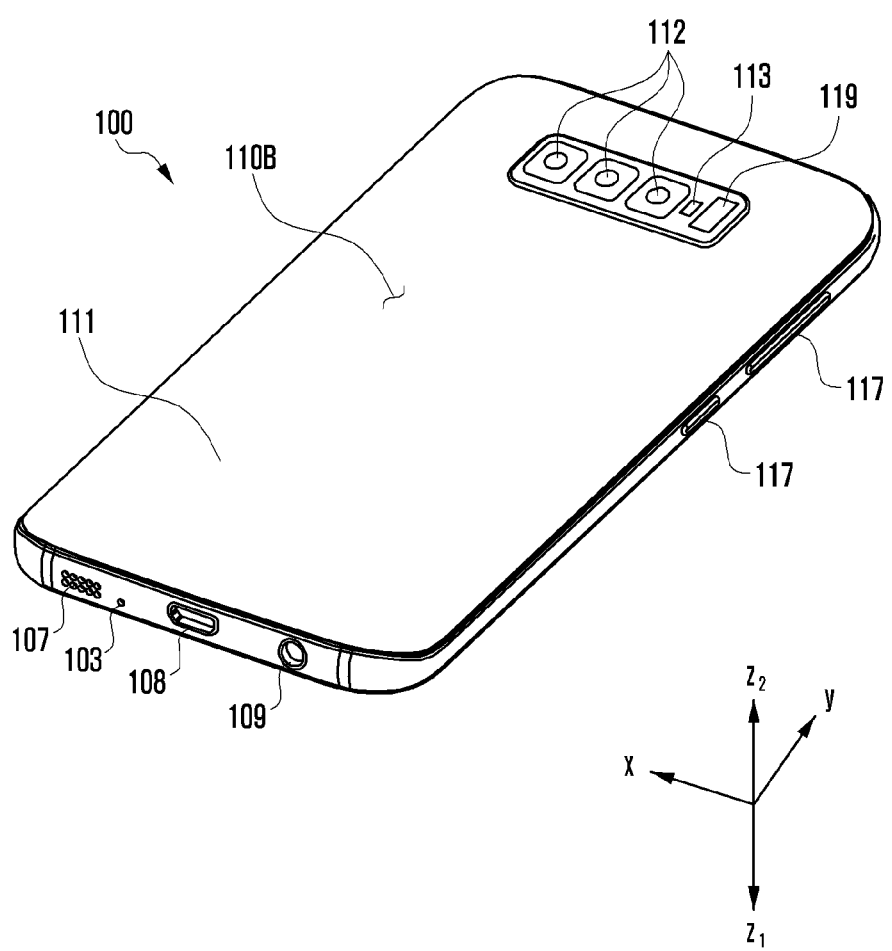
FIG. 2 is a perspective view of a rear side of the electronic device of FIG. 1 according to various embodiments of the disclosure.

FIG. 1 is a perspective view of a front side of an electronic device 100 according to various embodiments of the disclosure. FIG. 2 is a perspective view of a rear side of the electronic device 100 of FIG. 1 according to various embodiments of the disclosure.

Referring to FIG. 1 and FIG. 2, the electronic device 100 according to an embodiment may include a housing 110 including a first side (or front side) 110A, a second side (or rear side) 110B, and a lateral side 110C surrounding a space between the first side 110A and the second side 110B. The lateral side 110C may extend in a third direction x or a fourth direction y. In another embodiment (not shown), the housing may refer to a structure forming part of the first side 110A, the second side 110B, and the lateral side 110C of FIG. 1. According to an embodiment, the first side 110A may be formed by a front plate 102 at least a portion of which is substantially transparent (e.g., a glass plate including various coating layers, or a polymer plate). The second side 110B may be formed by a substantially opaque rear plate 111. The rear plate 111 may be formed by, for example, coated or colored glass, ceramic, a polymer, a metal (e.g., aluminum, stainless steel (STS), or magnesium), or a combination of at least two of the foregoing materials. The lateral side 110C may be coupled to the front plate 102 and the rear plate 111, and may be formed by a lateral bezel structure 118 (or "lateral member") including a metal and/or a polymer. In an embodiment, the rear plate 111 and the lateral bezel structure 118 may be integrally formed, and may include the same material (e.g., a metallic material, such as aluminum).

According to an embodiment, the electronic device 100 may include at least one of a display 101, an input device 103, sound output devices 107 and 114, sensor modules 104 and 119, cameras 105 and 112, a key input device 117, an indicator (not shown), and connectors 108 and 109. In an embodiment, the electronic device 100 may omit at least one (e.g., the key input device 117, the connectors 108 and 109, or the indicator) of the components, or may additionally include another component.

According to an embodiment, the display 101 may be seen through, for example, a portion of the front plate 102. In an embodiment, at least a portion of the display 101 may be seen through the front plate 102 forming the first side 110A. In an embodiment, an edge of the display 101 may be formed substantially the same as the shape of an adjacent outer periphery of the front plate 102. In another embodiment (not shown), to expand an area through which the display 101 is exposed, a distance between an outer periphery of the display 101 and the outer periphery of the front plate 102 may be substantially uniform.

According to an embodiment, a surface (or the front plate 102) of the housing 110 may include a screen display area formed as the display 101 is visually exposed. According to an embodiment, the screen display area may include a camera overlapping area A1 (e.g., a first area or UDC area) in which a first camera 105 is disposed downwards (e.g., in a z2 direction) and a general display area A2 (e.g., a second area or general area) in which no camera is disposed downwards (e.g., in the z2 direction). According to another embodiment, the screen display area may further include a sensor overlapping area (not shown) in which at least one sensor module (not shown) is disposed downwards (e.g., in the z2 direction). For example, the at least one sensor module may be various types of sensors that operates by obtaining external light.

According to an embodiment, the cameras 105 and 112 may include the first camera 105 disposed on the first side 110A of the electronic device 100 and/or a second camera 112 disposed on the second side 110B of the electronic device 100. The cameras 105 and 112 may include one or a plurality of lenses, image sensors, and/or image signal processors. The cameras 105 and 112 may further include a flash 113. In an embodiment, two or more lenses (wide-angle lenses, ultra-wide-angle lenses, or telephoto lenses) and image sensors may be disposed on the first side 110A or the second side 110B of the electronic device 100. In an embodiment, the electronic device 100 may include a plurality of cameras 105 and 112. For example, the electronic device 100 may include a plurality of cameras having different properties (e.g., angles of view) or functions (e.g., dual cameras or triple cameras). For example, a plurality of cameras 105 and 112 including lenses having different angles of view may be configured, and the electronic device 100 may perform control to change angles of view of the cameras 105 and 112 executed in the electronic device 100, based on a user's selection. The plurality of cameras 105 and 112 may include at least one of a wide-angle camera, a telephoto camera, a color camera, a monochrome camera, or an infrared (IR) camera (e.g., a time-of-flight (TOF) camera or a structured light camera). According to an embodiment, the IR camera may operate as at least a part of the sensor module.

According to an embodiment, the first camera 105 may be disposed under the camera overlapping area A1 of the display 101 (e.g., in the z2 direction). The first camera 105 may be referred to as an under-display camera (UDC). For example, as the first camera 105 is disposed under the camera overlapping area A1 of the display (e.g., in the z2 direction), the position of the first camera 105 may not be visually distinguished (or exposed). According to an embodiment, when looking at the display 101 from the front (e.g., in a z1 direction), the first camera 105 is disposed in the camera overlapping area A1, which is at least a portion of the display, and may thus obtain an image of an external subject while not being visually exposed to the outside. For example, when looking at the display 101 from the front (e.g., in the z1 direction), the first camera 105 is disposed to overlap with at least a portion of the camera overlapping area A1, and may thus obtain an image of an external subject while not being visually exposed.

According to an embodiment, a recess or an opening may be formed in a portion of the screen display area (e.g., the first side 110A or a first area 110D) of the display 101, and at least one of the sound output device 114, the sensor module 104, a light emitting element (e.g., a flash), and the camera 105, which is at least partially aligned with the recess or the opening, may be included. In another embodiment, at least one of the sound output device 114, the sensor module 119, the light emitting device (e.g., a flash), and the camera 112 may be included under the screen display area of the display 101.

According to an embodiment, the display 101 may be coupled to or disposed adjacent to a touch sensing circuit, a pressure sensor for measuring the strength (pressure) of a touch, and/or a digitizer for detecting a stylus pen of a magnetic field type.

According to an embodiment, the input device 103 may include a microphone 103. In an embodiment, the input device 103 may include a plurality of microphones 103 disposed to detect the direction of a sound. The sound output devices 107 and 114 may include speakers 107 and 114. The speakers 107 and 114 (i.e., sound output devices) may include an external speaker 107 and a receiver 114 for a call. In an embodiment, the microphone 103, the speakers 107 and 114, and the connectors 108 and 109 may be disposed in the space of the electronic device 100, and may be exposed to an external environment through at least one hole formed in the housing 110. In an embodiment, the hole formed in the housing 110 may be commonly used for the microphone 103 and the speakers 107 and 114. In an embodiment, the sound output devices 107 and 114 may include a speaker (e.g., a piezo speaker) operating with the hole formed in the housing 110 excluded.

According to an embodiment, the sensor modules 104 and 119 may generate an electrical signal or data value corresponding to an internal operating state of the electronic device 100 or an external environmental state. The sensor modules 104 and 119 may include, for example, a first sensor module 104 (e.g., a proximity sensor) and/or a second sensor module (not shown) (e.g., a fingerprint sensor) disposed on the first side 110A of the housing 110 and/or a third sensor module 119 (e.g., a heart rate monitor (HRM) sensor) disposed on the second side 110B of the housing 110. The fingerprint sensor may be disposed on a portion of the first side 110A or the second side 110B of the housing 110, or under the display 101. The electronic device 100 may further include a sensor module not shown, for example, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor. According to various embodiments, the electronic device 100 has a bar-type or plate-type appearance, but the disclosure is not limited thereto. For example, the illustrated electronic device 100 may include various shapes of electronic devices, such as a foldable electronic device, a slidable electronic device, a stretchable electronic device, and/or a rollable electronic device.

Figure 3:
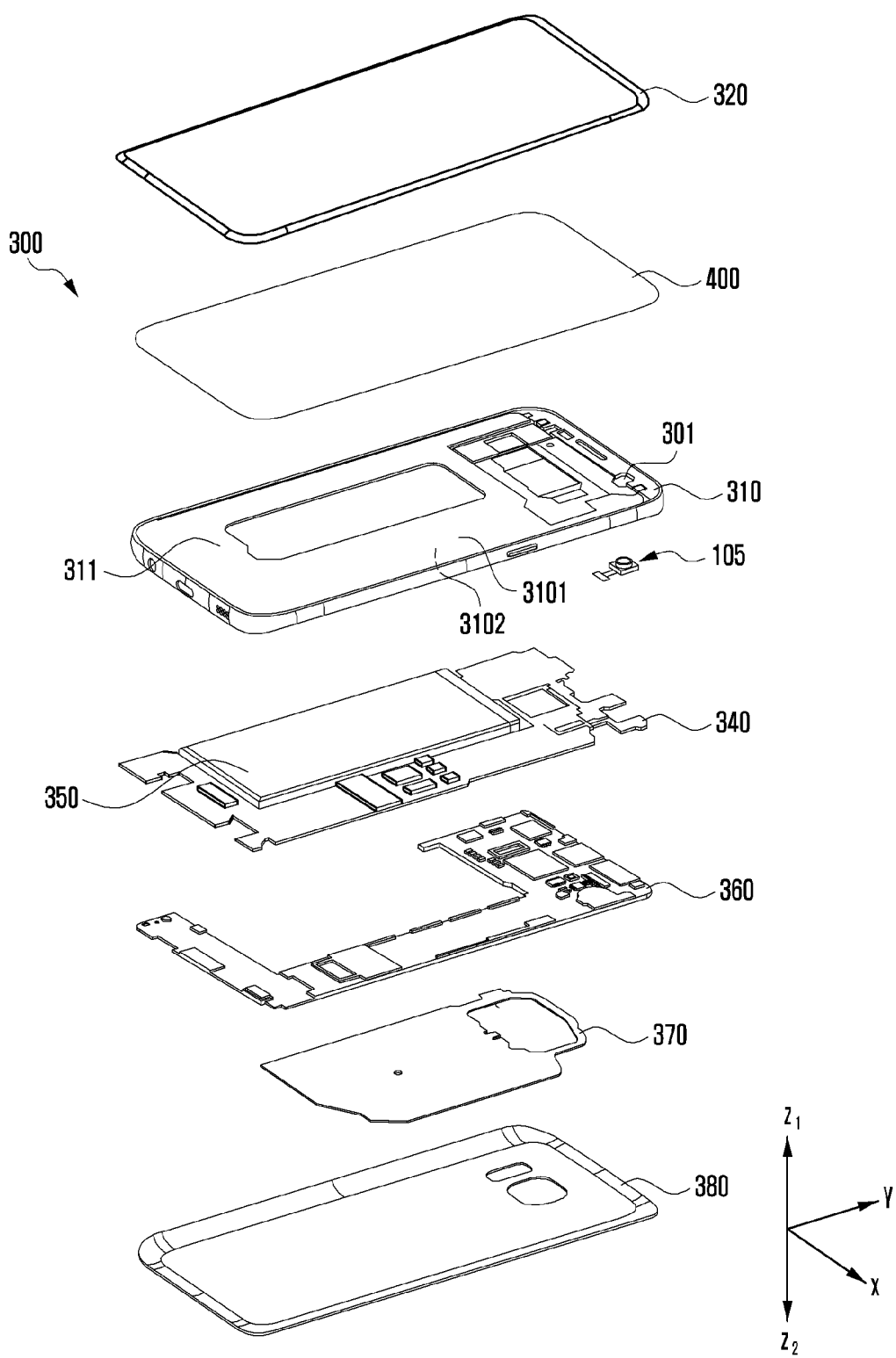
FIG. 3 is an exploded perspective view of the electronic device of FIG. 1 according to various embodiments of the disclosure.

FIG. 3 is an exploded perspective view of the electronic device 100 of FIG. 1 according to various embodiments of the disclosure.

An electronic device 300 of FIG. 3 may be at least partially similar to the electronic device 100 of FIG. 1 and FIG. 2, or may further include another embodiment of the electronic device.

Referring to FIG. 3, the electronic device 300 (e.g., the electronic device 100 of FIG. 1 or FIG. 2) may include a lateral member 310 (e.g., the lateral bezel structure 118 of FIG. 2), a first support member 311 (e.g., a bracket or support structure), a front plate 320 (e.g., a front cover, the front plate 102 of FIG. 1), a display 400 (e.g., the display 101 of FIG. 1), a printed circuit board 340 (e.g., a printed circuit board (PCB), a flexible PCB (FPCB), or a rigid flexible PCB (RFPCB)), a battery 350, a second support member 360 (e.g., a rear case), an antenna 370, and a rear plate 380 (e.g., a rear cover, the rear plate 111 of FIG. 2). In an embodiment, the electronic device 300 may omit at least one (e.g., the first support member 311 or the second support member 360) of the components or may additionally include another component. At least one of the components of the electronic device 300 may be the same as or similar to at least one of the components of the electronic device 100 of FIG. 1 or FIG. 2, and a redundant description will be omitted below.

According to an embodiment, the first support member 311 may be disposed inside the electronic device 300 to be connected to the lateral member 310 or to be integrally formed with the lateral member 310. The first support member 311 may be formed of, for example, a metallic material and/or a nonmetallic (e.g., polymer) material. The display 400 may be coupled to one side of the first support member 311, and the printed circuit board 340 may be coupled to another side thereof.

According to an embodiment, a processor, a memory, and/or an interface may be mounted on the printed circuit board 340. The processor may include, for example, one or more of a central processing unit, an application processor, a graphics processing unit, an image signal processor, a sensor hub processor, or a communication processor.

According to an embodiment, the memory may include, for example, a volatile memory or a nonvolatile memory.

According to an embodiment, the interface may include, for example, a high definition multimedia interface (HDMI), a universal serial bus (USB) interface, an SD card interface, and/or an audio interface. The interface may, for example, electrically or physically connect the electronic device 300 to an external electronic device, and may include a USB connector, an SD card/MMC connector, or an audio connector.

According to an embodiment, the battery 350 is a device for supplying power to at least one component of the electronic device 300, and may include, for example, a non-rechargeable primary cell, a rechargeable secondary cell, or a fuel cell. At least part of the battery 350 may be disposed substantially on the same plane as, for example, the printed circuit board 340. The battery 350 may be integrally disposed in the electronic device 300. In another embodiment, the battery 350 may be disposed to be detachable from the electronic device 300.

According to an embodiment, the antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication, for example, with the external device, or may wirelessly transmit or receive power required for charging. In another embodiment, an antenna structure may be formed by part of the lateral bezel structure 310 and/or the first support member 311 or a combination thereof.

According to an embodiment, the second support member 360 (e.g., the rear case) may be disposed between the printed circuit board 340 and the antenna 370. According to an embodiment, the second support member 360 may include one side to which at least one of the printed circuit board 340 or the battery 350 is coupled and another side to which the antenna 370 is coupled.

According to an embodiment, the first support member 311 of the lateral member 310 may include a first side 3101 facing the front plate 320 and a second side 3102 facing an opposite direction to the direction the first side 3101 faces (e.g., the direction of the rear plate 380, z2 direction). According to an embodiment, the camera 105 (e.g., the first camera 105 of FIG. 1) may be disposed between the first support member 311 and the rear plate 380. According to an embodiment, the camera 105 may be disposed to protrude or to be seen in the direction of the front plate 320 (i.e., z1 direction) through a through hole 301 extending from the first side 3101 of the first support member 311 to the second side 3102. According to an embodiment, a portion of the camera 105 protruding through the through hole 301 may be disposed to detect an external environment at a corresponding position of the display 400. In another embodiment, when the camera 105 is disposed between the display 400 and the first support member 311, the through hole 301 may be unnecessary.

Hereinafter, an arrangement relationship between the display 400 and the camera 105 in the electronic device 300 will be described in detail.

Figure 4:
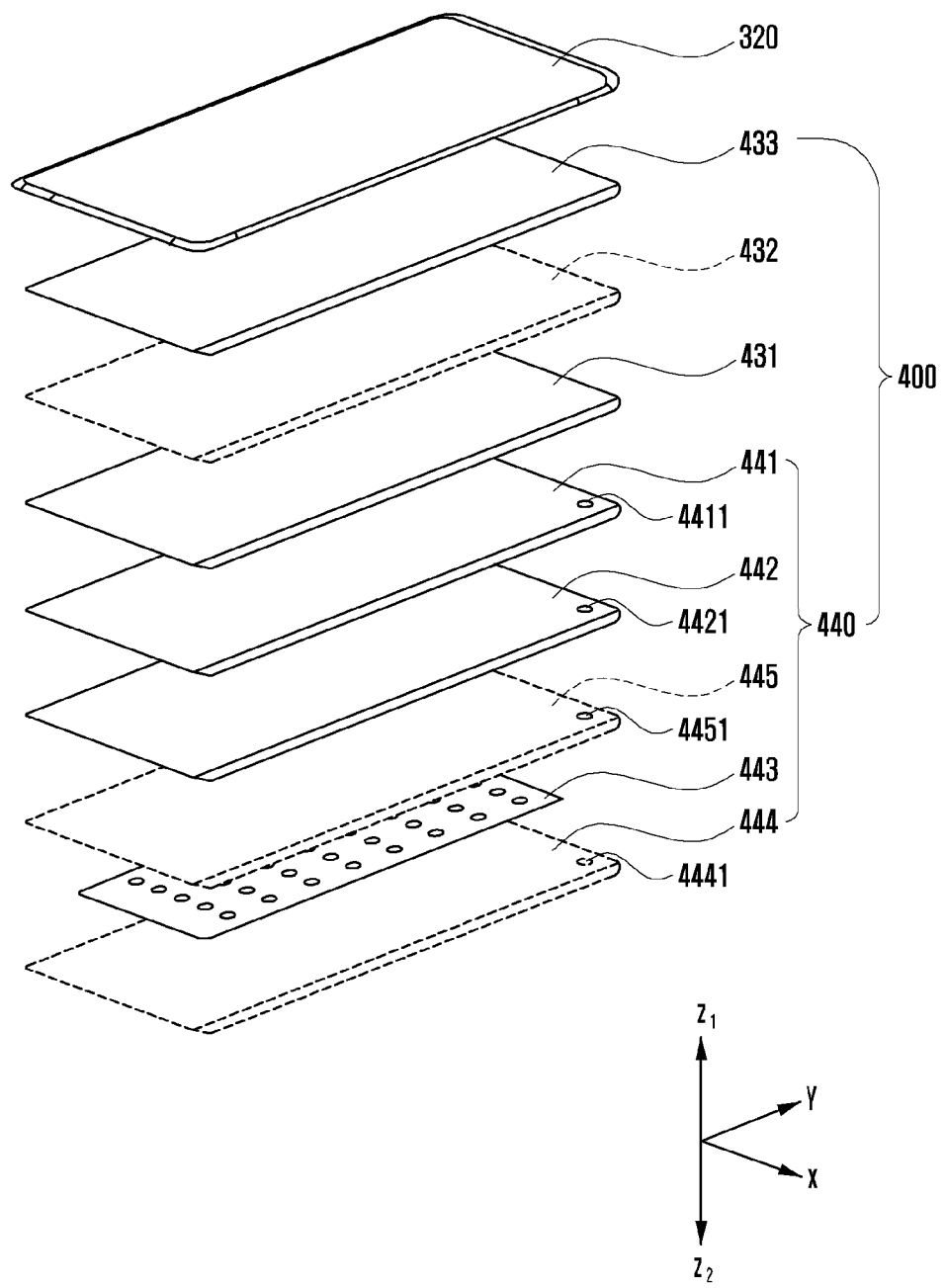
FIG. 4 is an exploded perspective view of a display shown in FIG. 3.

FIG. 4 is an exploded perspective view of the display 400 shown in FIG. 3 according to various embodiments.

The display 400 of FIG. 4 may be at least partially similar to the display 101 of FIG. 1 and the display 400 of FIG. 3, or may further include another embodiment of the display.

Referring to FIG. 4, the display 400 according to an embodiment may include a display panel 431, a color filter layer 433 disposed in a first direction (e.g., a z1 direction) from the display panel 431, a touch panel 432 disposed between the color filter layer 433 and the display panel 431, and/or a subsidiary material layer 440 disposed in a second direction (e.g., a z2 direction) from the display panel 431. In another embodiment, the touch panel 432 may be disposed in the first direction from the color filter layer 433.

According to an embodiment, the display panel 431 may include organic light emitting diodes (OLEDs). For example, the display panel 431 may include an unbreakable (UB) type OLED display (e.g., a curved display). According to an embodiment, the display panel 431 may include a first pixel displaying a first color (e.g., red), a second pixel displaying a second color (e.g., green), and/or a third pixel displaying a third color (e.g., blue). According to an embodiment, the first pixel to the third pixel may be arranged in a row according to a specified rule. For example, the first pixel to the third pixel may be arranged in a row on an xy plane shown in FIG. 4. According to various embodiments, the display panel 431 is not limited to including pixels of three colors, but may include pixels of more colors. For example, the display panel 431 may include pixels of three or more colors. According to various embodiments, a method for arranging the pixels of the display panel 431 may be variously modified or changed. According to various embodiments, the area or shape of the pixels of the display panel 431 may be variously modified or changed.

According to an embodiment, the display 400 may not include a polarizer (POL) (e.g., a circular polarizer), which is a polarizing plate, and may include the color filter layer 433 by a color filter on encapsulation (COE) method. According to an embodiment, the display 400 may not include a POL, which is a polarizing plate, thereby increasing light transmittance and reduce thickness. For example, the display 400 according to an embodiment may omit a POL, thereby increasing the light transmittance by about 20% or more and reducing the thickness by about 100 micrometers (μm) to about 150 μm, compared to a conventional display including a POL. According to an embodiment, the color filter layer 433 may perform an equivalent or similar function to a function of a POL applied to a display including organic light emitting diodes (OLEDs). For example, the color filter layer 433 may block reflected light from the display panel 431, thereby improving outdoor visibility.

According to an embodiment, the subsidiary material layer 440 may include at least one polymer member 441 and 442 disposed on a rear side (e.g., a side facing the second direction (z2 direction)) of the display panel 431, at least one functional member 443 disposed on a rear side (e.g., a side facing the second direction (z2 direction)) of the at least one polymer member 441 and 442, and a metal sheet 444 disposed on a rear side (e.g., a side facing the second direction (z2 direction)) of the at least one functional member 443.

According to an embodiment, the at least one polymer member 441 and 442 may include a light block layer 441 (e.g., a black layer including an uneven pattern) to remove air bubbles that may be generated between the display panel 431 and attached elements thereunder (e.g., the second direction (z2 direction)) and to block light generated in the display panel 431 or light incident from the outside and/or a buffer layer 442 (e.g., a sponge layer) disposed for cushioning. According to an embodiment, the buffer layer 442 may include a cushion formed of a polymer.

According to an embodiment, the at least one functional member 443 may include a heat radiation sheet (e.g., a graphite sheet) for heat radiation, a force touch FPCB, a fingerprint sensor FPCB, an antenna radiator for communication, a conductive/nonconductive tape, or an open cell sponge.

According to an embodiment, the metal sheet 444 is a conductive member (e.g., a metal plate), and may help to reinforce rigidity of an electronic device (e.g., the electronic device 300 of FIG. 3) and may be used to block ambient noise and to disperse heat emitted from surrounding heat dissipating components. According to an embodiment, the metal sheet 444 may include at least one of Cu, Al, Mg, steel use stainless (SUS) (e.g., stainless steel (STS)), or CLAD (e.g., a laminated member in which SUS and Al are alternately disposed). In an embodiment, the metal sheet 444 may include other alloy materials.

According to an embodiment, the subsidiary material layer 440 of the display 400 may further include a detection member 445 for detecting an input by a writing member of an electromagnetically induced type (e.g., an electronic pen). According to an embodiment, the detection member 445 is a digitizer, and may include a coil member disposed on a dielectric substrate to detect an electromagnetically induced resonance frequency applied from the electronic pen. In an embodiment, the detection member 445 may be omitted. According to an embodiment, the detection member 445 may be disposed between the at least one polymer member 442 and the functional member 443. In another embodiment, the detection member 445 may be disposed between the display panel 431 and the at least one polymer member 441 and 442. In another embodiment, the detection member 445 may be disposed under the metal sheet 444.

According to various embodiments, the subsidiary material layer 440 may include openings 4411, 4421, 4451, and 4441 formed at positions overlapping a camera (e.g., the camera 105 of FIG. 3). According to an embodiment, the openings 4411, 4421, 4451, and 4441 may be formed by removing a portion the subsidiary material layer 440 of overlapping the camera 105. According to an embodiment, the camera 105 may be disposed to be close to the rear side (e.g., the side facing the second direction (z2 direction)) of the display panel 431 through the openings 4411, 4421, 4451, and 4441. According to an embodiment, the size (e.g., diameter or area) of the plurality of openings 4411, 4421, 4451, and 4441 may be based on the size of the camera 105 and/or the angle of view of the camera 105, and the respective openings 4411, 4421, 4451, and 4441 may have different sizes.

According to an embodiment, the front cover 320 (e.g., the front plate, a glass plate, a first cover member, or a cover member) may be disposed in the first direction from the display 400. According to an embodiment, the front cover 320 may include a glass layer. For example, the front cover 320 may include ultra-thin glass (UTG). In an embodiment, the front cover 320 may include a polymer. For example, the front cover 320 may include polyethylene terephthalate (PET) or polyimide (PI). In an embodiment, a plurality of front covers 320 may be disposed. In an embodiment, one layer of the plurality of front covers 320 may be disposed by an adhesive having a weaker adhesive strength or a thinner thickness than an adhesive (or bonding agent) of another layer to be properly separated from the other layer. According to an embodiment, the adhesive may include an optical clear adhesive (OCA), a pressure-sensitive adhesive (PSA), a heat-responsive adhesive, a light-responsive adhesive, a general adhesive, and/or a double-sided tape.

According to an embodiment, the display 400 may not include at least one of the touch panel 432, the detection member 445, and/or the metal sheet 444.

According to an embodiment, the display 400 may include a control module (not shown). According to an embodiment, the control module may include an FPCB to electrically connect a printed circuit board (e.g., the printed circuit board 340 of FIG. 3) and the display panel 431 of the electronic device (e.g., the electronic device 300 of FIG. 3) and a display driver IC (DDI) mounted on the FPCB. According to an embodiment, the control module (not shown) may include a display driver IC (DDI) and/or a touch display driver IC (TDDI) disposed in a chip on panel (COP) or chip on film (COF) manner.

In an embodiment, the display 400 may include a fingerprint sensor (not shown) disposed adjacent to the control module. According to an embodiment, the fingerprint sensor may include an ultrasonic or optical fingerprint sensor capable of recognizing a fingerprint of a finger in contact with or in proximity to an external surface of the front cover 320 through a hole at least partially formed in some of the components of the display 400.

Figure 5:
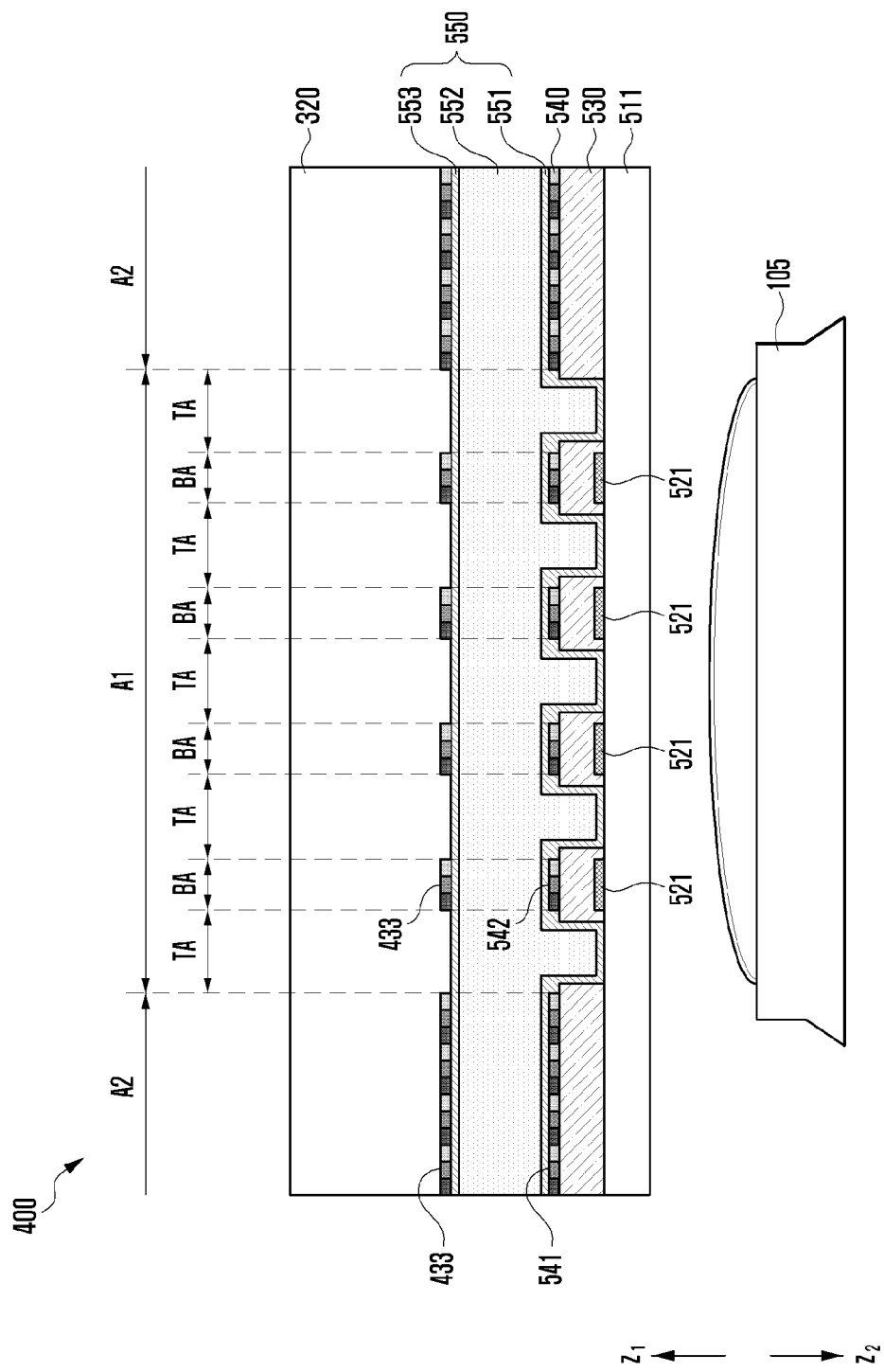
FIG. 5 is a cross-sectional view illustrating a camera overlapping area of a display according to an embodiment.

FIG. 5 is a cross-sectional view illustrating a camera 105 overlapping area (e.g., a first area A1) of a display 400 according to an embodiment. For example, FIG. 5 may be a partial cross-sectional view of the electronic device 100 viewed along line '5-5 of FIG. 1.

The display 400 shown in FIG. 5 may be at least partially similar to the display 400 shown in FIG. 4, or may further include another embodiment.

Referring to FIG. 5, the display 400 according to an embodiment may include a substrate 511, a black mask 521 disposed in a first direction z1 (e.g., an upward direction) from the substrate 511, a silicon layer (e.g., low-temperature polycrystalline silicon (LTPS) or low-temperature polycrystalline oxide (LTPO)) 530 disposed in the first direction z1 from the substrate 511 including the black mask 521, a pixel layer 540 disposed in the first direction z1 from the silicon layer 530, and/or an organic encapsulation layer 550 disposed in the first direction z1 from the pixel layer 540. According to an embodiment, a color filter layer 433 may be disposed in the first direction z1 from the organic encapsulation layer 550 of the display 400. According to an embodiment, a touch sensor layer (e.g., the touch panel 432 of FIG. 4) not shown may be further disposed between the organic encapsulation layer 550 and the color filter layer 433. According to another embodiment, the touch sensor layer may be disposed in the first direction z1 from the color filter layer 433. A window may be disposed as a front cover (e.g., the front cover 320 of FIG. 4) in the first direction z1 in the display 400.

According to an embodiment, the silicon layer 530 may include a thin film transistor (TFT) (not shown) for driving the pixel layer 540 and a plurality of wirings.

According to an embodiment, in the first area A1, a driving circuit for driving a pixel may not be disposed, but a pixel and a plurality of transparent wirings electrically connected to the pixel may be disposed. According to an embodiment, when a driving circuit for driving a pixel is not disposed in the first area A1, the pixel disposed in the first area A1 may be driven by a driving circuit disposed in a second area A2. According to an embodiment, when a driving circuit for driving a pixel is not disposed in the first area A1, the pixel disposed in the first area A1 may be driven by a driving circuit (not shown) disposed between the first area A1 and the second area A2. According to an embodiment, when a driving circuit for driving a pixel is not disposed in the first area A1, the pixel disposed in the first area A1 may be driven by a driving circuit (not shown) disposed in the second area A2 to drive a pixel disposed in the second area A2. In this case, one driving circuit (not shown) disposed in the second area A2 may drive not only the pixel disposed in the second area A2 but also the pixel disposed in the first area A1. For example, when a red pixel is disposed in the second area A2 and a driving circuit for driving the red pixel in the second area A2 is disposed in the second area A2, the driving circuit may drive both the red pixel in the second area A2 and a red pixel in the first area A1.

According to an embodiment, the pixel layer 540 may include pixels of an organic light emitting diodes (OLED) type. According to an embodiment, the pixel layer 540 may include a first subpixel displaying a first color (e.g., red), a second subpixel displaying a second color (e.g., green), and/or a third subpixel displaying a third color (e.g., blue). According to an embodiment, first to third subpixels disposed in the second area A2 may be arranged according to a specified rule. According to an embodiment, to prevent unintentional diffraction of light, first to third subpixels disposed in the first area A1 may be irregularly arranged. According to an embodiment, to prevent unintentional diffraction of light, a driving circuit or the wirings disposed in the first area A1 may be irregularly arranged.

According to an embodiment, in the first area A1, a first group of pixels 542 may be arranged, and the black mask 521 and the color filter layer 433 may be arranged to overlap with the first group of pixels 542. According to an embodiment, an area at least partially overlapping with the pixels 542 of the first group may be referred to as a block area BA.

According to an embodiment, the black mask 521 may be an opaque metal. According to various embodiments, the black mask 521 may be changed to or replaced with a term, such as an anti-light diffraction film, an anti-light transmission film, an anti-low reflection light diffraction film, or an anti-low reflection light transmission film. According to various embodiments, the material of the black mask 521 may include an organic material or an inorganic material in addition to the opaque metal. According to an embodiment, the material of the black mask 521 may include a complex laminated structure of a metal, an organic film, and an inorganic film. According to an embodiment, unlike the illustrated example, the black mask 521 may be disposed in the substrate 511, under the substrate 511, or in at least a partial layer between the pixels and the substrate 511.

According to an embodiment, the black mask 521 may not be disposed in an area between the pixels 542 of the first group. For example, an area between the pixels 542 of the first group may be referred to as a transmission area TA.

According to an embodiment, in the second area A2, a second group of pixels 541 may be arranged, and the color filter layer 433 may be arranged to overlap the second group of pixels 541.

According to an embodiment, the arrangement density of the first group of pixels 542 may be lower than the arrangement density of the second group of pixels 541 are disposed. For example, the pixels 541 of the second group may be densely disposed compared to the pixels 542 of the first group. According to an embodiment, the arrangement density of the pixels 542 of the first group may be designed to be lower than the density of the pixels 541 of the second group, thereby increasing light transmittance in the first area A1.

According to an embodiment, the organic encapsulation layer 550 may include a first inorganic layer 551 disposed in the first direction z1 from the pixel layer 540, an organic layer 552 disposed in the first direction z1 from the first inorganic layer 551, and a second inorganic layer 553 disposed in the first direction z1 from the organic layer 552.

According to an embodiment, the pixel layer 540 and the silicon layer 530 may be removed from the transmitting area TA. For example, the substrate 511 and the organic encapsulation layer 550 may be in contact with each other in the transmission area TA. For example, the substrate 511 and the first inorganic layer 551 of the organic encapsulation layer 550 may be in contact with each other in the transmission area TA.

According to an embodiment, the size of the pixels disposed in the first area A1 may be different from the size of the pixels disposed in the second area A2. According to an embodiment, the size of the pixels disposed in the first area A1 may be smaller than the size of the pixels disposed in the second area A2, and accordingly the light transmittance in the first area A1 may be designed to be higher than light transmittance in the second area A2. According to an embodiment, driving may be performed such that the brightness of light output by one pixel disposed in the first area A1 is higher than the brightness of light output by one pixel disposed in the second area A2, thereby reducing brightness difference between the first area A1 and the second area A2. In this case, to reduce burn-in difference between the first area A1 and the second area A2, the electronic device 300 may be designed such that the size of the pixels disposed in the first area A1 is larger than the size of the pixels disposed in the second area A2.

Figure 6:
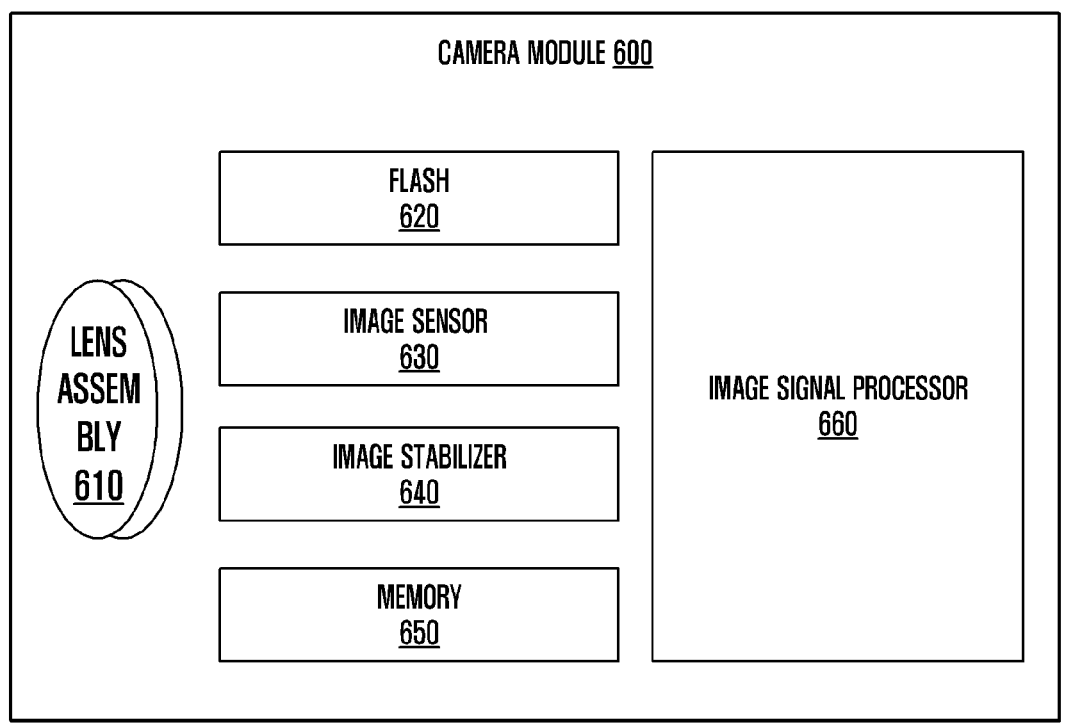
FIG. 6 is a block diagram illustrating a camera module according to various embodiments.

FIG. 6 is a block diagram illustrating the camera module 600 according to various embodiments. Referring to FIG. 6, the camera module 600 may include a lens assembly 610, a flash 620, an image sensor 630, an image stabilizer 640, memory 650 (e.g., buffer memory), or an image signal processor 660. The lens assembly 610 may collect light emitted or reflected from an object whose image is to be taken. The lens assembly 610 may include one or more lenses. According to an embodiment, the camera module 600 may include a plurality of lens assemblies 610. In such a case, the camera module 600 may form, for example, a dual camera, a 360-degree camera, or a spherical camera. Some of the plurality of lens assemblies 610 may have the same lens attribute (e.g., view angle, focal length, auto-focusing, f number, or optical zoom), or at least one lens assembly may have one or more lens attributes different from those of another lens assembly. The lens assembly 610 may include, for example, a wide-angle lens or a telephoto lens.

The flash 620 may emit light that is used to reinforce light reflected from an object. According to an embodiment, the flash 620 may include one or more light emitting diodes (LEDs) (e.g., a red-green-blue (RGB) LED, a white LED, an infrared (IR) LED, or an ultraviolet (UV) LED) or a xenon lamp. The image sensor 630 may obtain an image corresponding to an object by converting light emitted or reflected from the object and transmitted via the lens assembly 610 into an electrical signal. According to an embodiment, the image sensor 630 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 630 may be implemented using, for example, a charged coupled device (CCD) sensor or a complementary metal oxide semiconductor (CMOS) sensor.

The image stabilizer 640 may move the image sensor 630 or at least one lens included in the lens assembly 610 in a particular direction, or control an operational attribute (e.g., adjust the read-out timing) of the image sensor 630 in response to the movement of the camera module 600 or the electronic device 100 including the camera module 600. This allows compensating for at least part of a negative effect (e.g., image blurring) by the movement on an image being captured. According to an embodiment, the image stabilizer 640 may sense such a movement by the camera module 600 or the electronic device 100 using a gyro sensor (not shown) or an acceleration sensor (not shown) disposed inside or outside the camera module 600. According to an embodiment, the image stabilizer 640 may be implemented, for example, as an optical image stabilizer.

The memory 650 may store, at least temporarily, at least part of an image obtained via the image sensor 630 for a subsequent image processing task. For example, if image capturing is delayed due to shutter lag or multiple images are quickly captured, a raw image obtained (e.g., a Bayer-patterned image, a high-resolution image) may be stored in the memory 650, and its corresponding copy image (e.g., a low-resolution image) may be previewed via the display module (e.g., the display 101 of FIG. 1). Thereafter, if a specified condition is met (e.g., by a user's input or system command), at least part of the raw image stored in the memory 650 may be obtained and processed, for example, by the image signal processor 660. According to an embodiment, the memory 650 may be configured as at least part of the memory or as a separate memory that is operated independently from the memory.

The image signal processor 660 may perform one or more image processing with respect to an image obtained via the image sensor 630 or an image stored in the memory 650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 660 may perform control (e.g., exposure time control or read-out timing control) with respect to at least one (e.g., the image sensor 630) of the components included in the camera module 600. An image processed by the image signal processor 660 may be stored back in the memory 650 for further processing, or may be provided to an external component (e.g., the memory, the display module, the electronic device, or the server) outside the camera module 600. According to an embodiment, the image signal processor 660 may be configured as at least part of the processor, or as a separate processor that is operated independently from the processor (e.g., the processor 760 of FIG. 7). If the image signal processor 660 is configured as a separate processor from the processor 760, at least one image processed by the image signal processor 660 may be displayed, by the processor 760, via the display module as it is or after being further processed.

According to an embodiment, the electronic device 100 may include a plurality of camera modules 600 having different attributes or functions. In such a case, at least one of the plurality of camera modules 600 may form, for example, a wide-angle camera and at least another of the plurality of camera modules 600 may form a telephoto camera. Similarly, at least one of the plurality of camera modules 600 may form, for example, a front camera and at least another of the plurality of camera modules 600 may form a rear camera.

Figure 7:
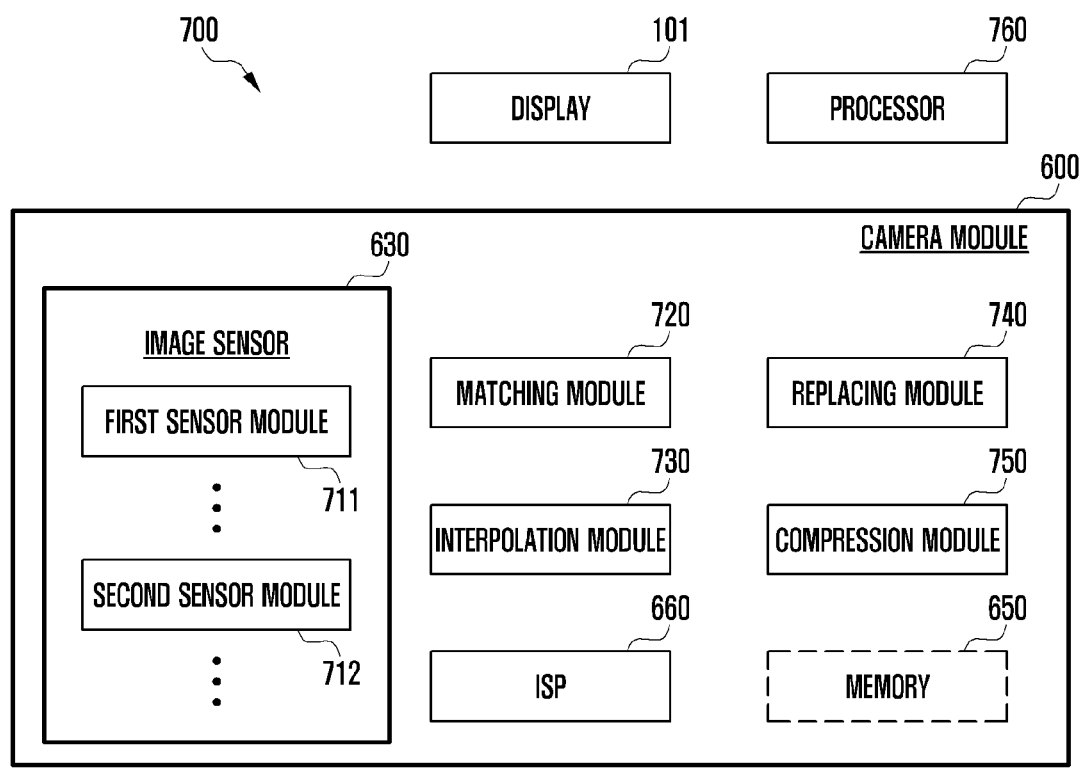
FIG. 7 is a block diagram of an electronic device including a camera module according to an embodiment.

FIG. 7 is a block diagram of an electronic device 700 including a camera module 600 according to an embodiment.

The electronic device 700 shown in FIG. 7 may be at least partially similar to the electronic device 100 shown in FIG. 1 and FIG. 2 or the electronic device 300 shown in FIG. 3 to FIG. 5, or may include another embodiment.

The camera module 600 shown in FIG. 7 may be at least partially similar to the camera module 600 shown in FIG. 6, or may include another embodiment.

Hereinafter, characteristics of the electronic device 700 that are not described in or changed from FIG. 1 to FIG. 5 and characteristics of the camera module 600 that are not described in or changed from FIG. 6 will be described with reference to FIG. 7.

Referring to FIG. 7, the electronic device 700 according to an embodiment may include a display 101, the camera module 600, and/or a processor 760.

According to an embodiment, a camera module 600 that is an under-display camera (UDC) may be disposed under a portion of a screen display area of the display 101. For example, the camera module 600 of FIG. 7 may be the same as or similar to the first camera 105 of FIG. 1.

According to an embodiment, the screen display area of the display 101 may include a first area (e.g., the camera overlapping area A1 of FIG. 1) overlapping at least part of the camera module 600 and a second area (e.g., the general display area A2 of FIG. 1) excluding the first area. According to an embodiment, in the first area of the display 101, the light transmittance of a specified wavelength (e.g., 440 nanometers (nm) to 450 nm) including a blue color may have a value of about 80% or less of the light transmittance of a specified wavelength (e.g., 540 nm to 550 nm) including a green color.

According to an embodiment, the camera module 600 may be disposed under the display 101, thus not being visually distinguished (or exposed) when the display 101 is viewed from above. According to an embodiment, the camera module 600 may obtain an image of an external subject by obtaining light that has passed through the first area of the display 101.

According to an embodiment, the camera module 600 may include an image sensor 630 including at least one first image sensor module 711 and/or at least one second image sensor module 712, a matching module 720, an interpolation module 730, a replacing module 740, a compression module 750, an image signal processor 660 (e.g., the image signal processor 660 of FIG. 6) (hereinafter, "ISP" 660), and/or a memory 650 (e.g., the memory 650 in FIG. 6).

According to an embodiment, the image sensor 630 of the camera module 600 may include the at least one first image sensor module 711 and the at least one second image sensor module 712.

According to an embodiment, the first image sensor module 711 may generate a first Bayer image processed by a first color filter array (e.g., a first color filter array 800 of FIG. 8) of a specified first type from an image sensed by the first image sensor module 711. According to an embodiment, the first color filter array 800 may include an RGBW Bayer filter including a first red (R) pixel 801, a first green (G) pixel 802, a first blue (B) pixel 803, and a first white (W) pixel 804. According to an embodiment, the first color filter array 800 may have a size of 4*4 pixels, half of which (e.g., eight pixels among 16 pixels) may be first white pixels 804. In the first color filter array 800, the other half (e.g., eight pixels among the 16 pixels) may be first red pixels 801, first green pixels 802, and first blue pixels 803 that are disposed in a proportion of 1:2:1. For example, the first color filter array 800 may have a pixel size of 4*4, and may include 16 pixels. According to an embodiment, the 16 pixels of the first color filter array 800 may include eight first white pixels 804, two first red pixels 801, four first green pixels 802, and two first blue pixels 803. Accordingly, in the first color filter array 800, the proportion of the first blue pixels 803 may be about 12.5%, and the proportion of the first green pixels 802 may be about 25%. The proportion of the first blue pixels 803 and the proportion of the first green pixels 802 in the first color filter array 800 are not limited to the above numerical values, and those skilled in the art will understand that a color filter corresponds to the first color filter array 800 according to various embodiments of the disclosure as long as the proportion of the first green pixels 802 is greater than the proportion of the first blue pixels 803.

According to an embodiment, the second image sensor module 712 may generate a second Bayer image processed by a second color filter array (e.g., a second color filter array 900 of FIG. 9) of a specified second type from an image sensed by the second image sensor module 712. According to an embodiment, the second color filter array 900 may include an RGBW Bayer filter including a second red pixel 901, a second green pixel 902, a second blue pixel 903, and a second white pixel 904. According to an embodiment, the second color filter array 900 may have a size of 4*4 pixels, half of which (e.g., eight pixels among 16 pixels) may be second white pixels 904. In the second color filter array 900, the other half (e.g., eight pixels among the 16 pixels) may be second red pixels 901, second green pixels 902, and second blue pixels 903 that are disposed in a proportion of 1:1:2. For example, the second color filter array 900 may have a pixel size of 4*4, and may include 16 pixels. According to an embodiment, the 16 pixels of the second color filter array 900 may include eight second white pixels 904, two second red pixels 901, two second green pixels 902, and four second blue pixels 903. Accordingly, in the second color filter array 900, the proportion of the second blue pixels 903 may be about 25%, and the proportion of the second green pixels 902 may be about 12.5%. The proportion of the second blue pixels 903 and the proportion of the second green pixels 902 in the second color filter array 900 are not limited to the above numerical values, and those skilled in the art will understand that a color filter corresponds to the second color filter array 900 according to various embodiments of the disclosure as long as the proportion of the second blue pixels 903 is greater than the proportion of the second green pixels 902.

According to an embodiment, the first color filter array 800 and the second color filter array 900 are not limited to an RGBW type, and may be an RGB type in another embodiment.

According to an embodiment, the electronic device 700 may have a difference in the proportion of blue pixels regardless of the types of the first color filter array 800 and the second color filter array 900. For example, those skilled in the art will understand that there is no limitation in the type or pixel size of the first color filter array 800 and the second color filter array 900 if the first color filter array 800 includes a first proportion (e.g., about 12.5%) of first blue pixels 803 and the second color filter array 900 includes a second proportion (e.g., about 25%) of second blue pixels 903, which is greater than the first proportion.

According to an embodiment, compared to the first image sensor module 711, the second image sensor module 712 has the doubled proportion of blue pixels in the second color filter array 900, and may thus generate the second Bayer image in which the amount of blue components is increased. For example, the proportion of blue pixels in the first color filter array 800 is about 12.5% while the proportion of blue pixels in the second color filter array 900 is about 25%, and thus the second image sensor module 712 may generate the second Bayer image in which the amount of blue components corresponding to a blue color is increased. The second Bayer image may have a higher signal-to-noise ratio (SNR) for the blue color than the SNR of the first Bayer image.

According to an embodiment, the matching module 720 may receive two images having a disparity, and may correct the disparity between the two input images. For example, the matching module 720 may receive the first Bayer image and the second Bayer image from the first image sensor module 711 and the second image sensor module 712, respectively, and may correct a disparity between the first Bayer image and the second Bayer image. For example, the matching module 720 may receive a first corrected image generated based on the first Bayer image and a second corrected image generated based on the second Bayer image, and may correct a disparity between the first corrected image and the second corrected image.

According to an embodiment, the matching module 720 may perform an operation of matching the angle of view of the first Bayer image with the angle of view of the second Bayer image. For example, the first image sensor module 711 and the second image sensor module 712 may be disposed to be physically spaced apart from each other. Accordingly, the angle of view of the first Bayer image generated by the first image sensor module 711 and the angle of view of the second Bayer image generated by the second image sensor module 712 may be different. According to an embodiment, the matching module 720 may determine a common area of the first Bayer image and the second Bayer image (or a common area of the first corrected image and the second corrected image), and may match at least one object included in the common area to the same view point. In general, the size of an image (e.g., a joint photographic experts group (JPEG) image) finally output from the camera module 600 may be smaller than the size of a raw image generated by the image sensor 630. Accordingly, the matching module 720 may perform a matching process to reduce a wasted area due to a difference in angle of view.

According to an embodiment, the matching module 720 may use a compensation algorithm for correcting a positional difference between blue components of the first Bayer image and the second Bayer image based on the positions of the first blue pixels 803 of the first image sensor module 711 and the positions of the second blue pixel 903 of the second image sensor module 712 being different. For example, when correcting the disparity between the first Bayer image and the second Bayer image, the matching module 720 may use an algorithm of multiplying a green component by a specified weight and then aligning the green component with a blue component. This method may reduce a difference between channels associated with different colors and may enable the alignment operation to be efficiently performed when the different colors of components (e.g., blue components and green components) are disposed at corresponding positions (or coordinates of pixels). In various embodiments of the disclosure, there may be a plurality of pixel position compensation algorithms, and the above example is only one example and does not limit the disclosure.

According to an embodiment, the interpolation module 730 may perform color interpolating (e.g., color interpolation) on the first Bayer image and the second Bayer image, or a composite image obtained by synthesizing the first Bayer image and the second Bayer image. As described above, the first color filter array 800 of the first image sensor module 711 and the second color filter array 900 of the second image sensor module 712 may include an RGBW Bayer filter, and thus each pixel of the first image sensor module 711 and the second image sensor module 712 may have one channel among channels of four colors, which are red, green, blue, and white. According to an embodiment, the interpolation module 730 may perform a function of converting the first Bayer image and the second Bayer image into full color including four colors, which are RGBW. According to an embodiment, the interpolation module 730 may perform a color interpolation function for a specific pixel using a correlation between the specific pixel and pixels adjacent to the specific pixel.

According to an embodiment, the replacing module 740 may change information (or value) of the blue components included in the first Bayer image, based on information (or value) of the blue components included in the second Bayer image, thereby generating one synthesized image (e.g., a composite image). For example, the replacing module 740 may replace (or substitute) the information (or value) of the blue components included in the first Bayer image with the information (or value) of the blue components included in the second Bayer image. According to an embodiment, the second Bayer image may have a signal-to-noise ratio (SNR)

for the blue color higher than the SNR of the first Bayer image. According to an embodiment, the replacing module 740 may replace the information (or value) of the blue components included in the first Bayer image with the information of the blue components included in the second Bayer image, thereby generating the composite image with an improved SNR.

According to an embodiment, the ISP 660 may perform one or more types of image processing on an input image, thereby generating a corrected image. For example, the ISP 660 may perform at least one type of image processing on the first Bayer image, thereby generating the first corrected image. The ISP 660 may perform at least one type of image processing on the second Bayer image, thereby generating the second corrected image. For example, the ISP 660 may receive one composite image synthesized by the replacing module 740 and may perform at least one type of image processing on the input composite image, thereby generating a corrected image.

According to an embodiment, the one or more types of image processing may include, for example, depth map generation, 3D modeling, panorama generation, feature point extraction, image synthesis, or image compensation (e.g., noise reduction, resolution adjustment, brightness adjustment, blurring, sharpening, or softening). According to an embodiment, although the corrected image generated by the ISP 660 may have, for example, a JPEG format or a YUV format, those skilled in the art will readily understand that there is no limitation on the format of the corrected image. The ISP 660 may store the corrected image in the memory 650 (e.g., a VRAM), and the processor 760 may display the corrected image through the display 101. According to an embodiment, the ISP 660 may transmit the corrected image to the compression module 750.

According to an embodiment, the compression module 750 may compress the corrected image generated by the ISP 660 or the composite image synthesized by the replacing module 740 to generate a final image (e.g., a third image), and may store the final image in the memory 650. According to an embodiment, the compression module 750 may compress the corrected image, for example, by a method defined in the JPEG format, and those skilled in the art will readily understand that there is no limitation on a compression method.

Figure 8:
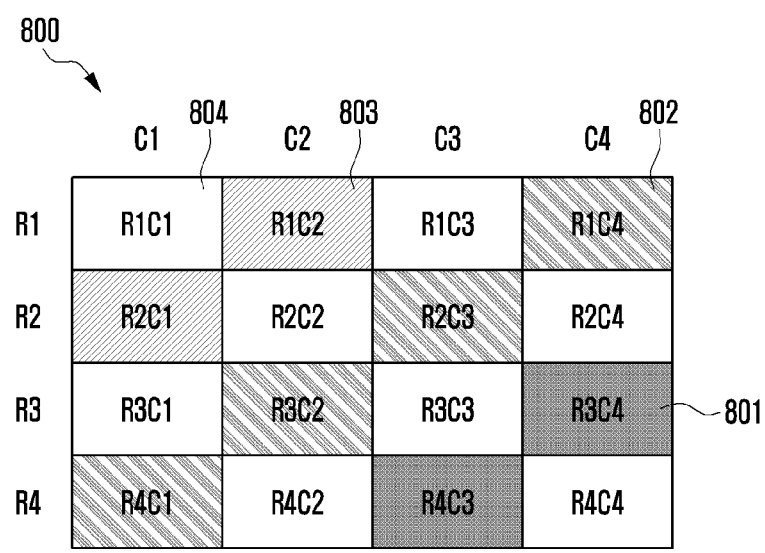
FIG. 8 illustrates an example of a first color filter array applied to a first image sensor module according to an embodiment.

FIG. 8 illustrates an example of the first color filter array 800 applied to the first image sensor module 711 according to an embodiment.

Figure 9:
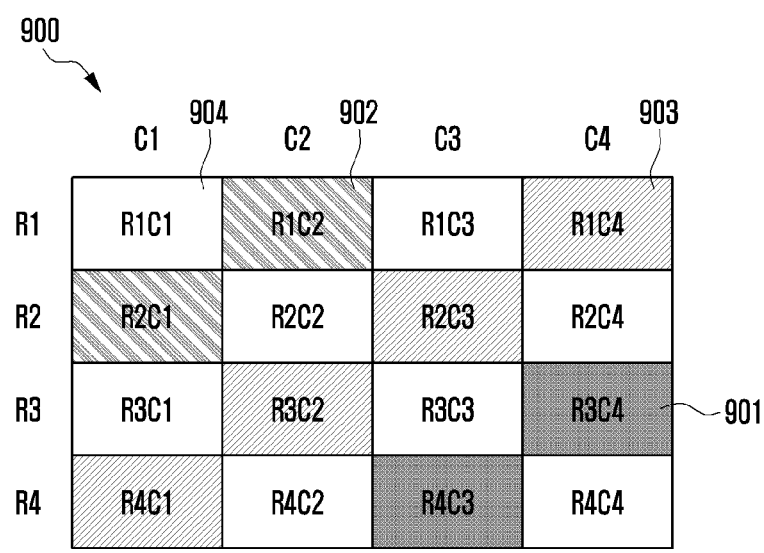
FIG. 9 illustrates an example of a second color filter array applied to a second image sensor module according to an embodiment.

FIG. 9 illustrates an example of the second color filter array 900 applied to the second image sensor module 712 according to an embodiment.

Referring to FIG. 8, the first color filter array 800 according to an exemplary embodiment may include an RGBW Bayer filter including a first red pixel 801, a first green pixel 802, a first blue pixel 803, and a first white pixel 804. The first color filter array 800 according to another embodiment may be configured as an RGB type including the first red pixel 801, the first green pixel 802, and the first blue pixel 803, without being limited to an RGBW type, and those skilled in the art will readily understand that there is no limitation on the type of the first color filter array 800.

According to an embodiment, the first color filter array 800 may have a pixel size of 4*4, and pixels may be disposed in a matrix including four rows (R1, R2, R3, and R4) and four columns (C1, C2, C3, and C4). In an embodiment, those skilled in the art will readily understand that the pixel size of the first color filter array 800 is not limited to 4*4.

According to an embodiment, half (e.g., eight pixels among 16 pixels) of the pixels (e.g., 16 pixels) of the first color filter array 800 may be first white pixels 804. In the first color filter array 800, the other half (e.g., eight pixels among the 16 pixels) may be first red pixels 801, first green pixels 802, and first blue pixels 803 that are disposed in a proportion of 1:2:1.

According to an embodiment, the 16 pixels of the first color filter array 800 may include eight first white pixels 804, two first red pixels 801, four first green pixels 802, and two first blue pixels 803. Accordingly, in the first color filter array 800, the proportion of the first blue pixels 803 may be about 12.5%.

The structure of the first color filter array 800 shown in FIG. 8 is only an example, and those skilled in the art will readily understand that and there is no limitation on the structure of the first color filter array 800.

Referring to FIG. 9, the second color filter array 900 according to an embodiment may include an RGBW Bayer filter including a second red pixel 901, a second green pixel 902, a second blue pixel 903, and a second white pixel 904. The second color filter array 900 according to another embodiment may be configured as an RGB type including the second red pixel 901, the second green pixel 902, and the second blue pixel 903, without being limited to an RGBW type, and those skilled in the art will readily understand that there is no limitation on the type of the second color filter array 900.

According to an embodiment, the second color filter array 900 may have a pixel size of 4*4, and pixels may be disposed in a matrix including four rows (R1, R2, R3, and R4) and four columns (C1, C2, C3, and C4). In an embodiment, those skilled in the art will readily understand that the pixel size of the second color filter array 900 is not limited to 4*4.

According to an embodiment, half (e.g., eight pixels among 16 pixels) of the pixels (e.g., 16 pixels) of the second color filter array 900 may be second white pixels 904. In the second color filter array 900, the other half (e.g., eight pixels among the 16 pixels) may be second red pixels 901, second green pixels 902, and second blue pixels 903 that are disposed in a proportion of 1:1:2.

According to an embodiment, the 16 pixels of the second color filter array 900 may include eight second white pixels 904, two second red pixels 901, two second green pixels 902, and four second blue pixels 903. Accordingly, in the second color filter array 900, the proportion of the second blue pixels 903 may be about 25%.

According to an embodiment, the second red pixels 901 of the second color filter array 900 may be disposed to correspond to the first red pixels 801 of the first color filter array 800. For example, the second red pixels 901 of the second color filter array 900 may be disposed at coordinates corresponding to the first red pixels 801 of the first color filter array 800. For example, the second red pixels 901 may be disposed at a third row and fourth column R3C4 and a fourth row and third column R4C3 in the second color filter array 900, respectively, and the first red pixels 801 may be disposed at a third row and fourth column R3C4 and a fourth row and third column R4C3 in the first color filter array 800.

According to an embodiment, the second green pixels 902 of the second color filter array 900 may be disposed to correspond to the first blue pixels 803 of the first color filter array 800. For example, the second green pixels 902 of the second color filter array 900 may be disposed at coordinates corresponding to the first blue pixels 803 of the first color filter array 800. For example, the second green pixels 902 may be disposed at a first row and second column R1C2 and a second row and first column R2C1 in the second color filter array 900, respectively, and the first blue pixels 803 may be disposed at a first row and second column R1C2 and a second row and first column R2C1 in the first color filter array 800, respectively.

According to an embodiment, the second blue pixels 903 of the second color filter array 900 may be disposed to correspond to the first green pixels 802 of the first color filter array 800. For example, the second blue pixels 903 of the second color filter array 900 may be disposed at coordinates corresponding to the first green pixels 802 of the first color filter array 800. For example, the second blue pixels 903 may be disposed at a first row and fourth column R1C4, a second row and third column R2C3, a third row and second column R3C2, and a fourth row and first column R4C1 in the second color filter array 900, respectively, and the first green pixels 802 may be disposed at a first row and fourth column R1C4, a second row and third column R2C3, a third row and second column R3C2, and a fourth row and first column R4C1 in the first color filter array 800, respectively.

According to an embodiment, the second white pixels 904 of the second color filter array 900 may be disposed to correspond to the first white pixels 804 of the first color filter array 800. For example, the second white pixels 904 of the second color filter array 900 may be disposed at coordinates corresponding to the first white pixels 804 of the first color filter array 800. The second white pixels 904 may be disposed at a first row and first column R1C1, a first row and third column R1C3, a second row and second column R2C2, a second row and fourth column R2C4, a third row and first column R3C1, a third row and third column R3C3, a fourth row and second column R4C2, and a fourth row and fourth column R4C4 in the second color filter array 900, respectively, and the first white pixels 804 may be disposed at a first row and first column R1C1, a first row and third column R1C3, a second row and second column R2C2, a second row and fourth column R2C4, a third row and first column R3C1, a third row and third column R3C3, a fourth row and second column R4C2, and a fourth row and fourth column R4C4 in the first color filter array 800, respectively.

The structure of the second color filter array 900 shown in FIG. 9 is only an example, and those skilled in the art will readily understand that and there is no limitation on the structure of the second color filter array 900.

Figure 10:
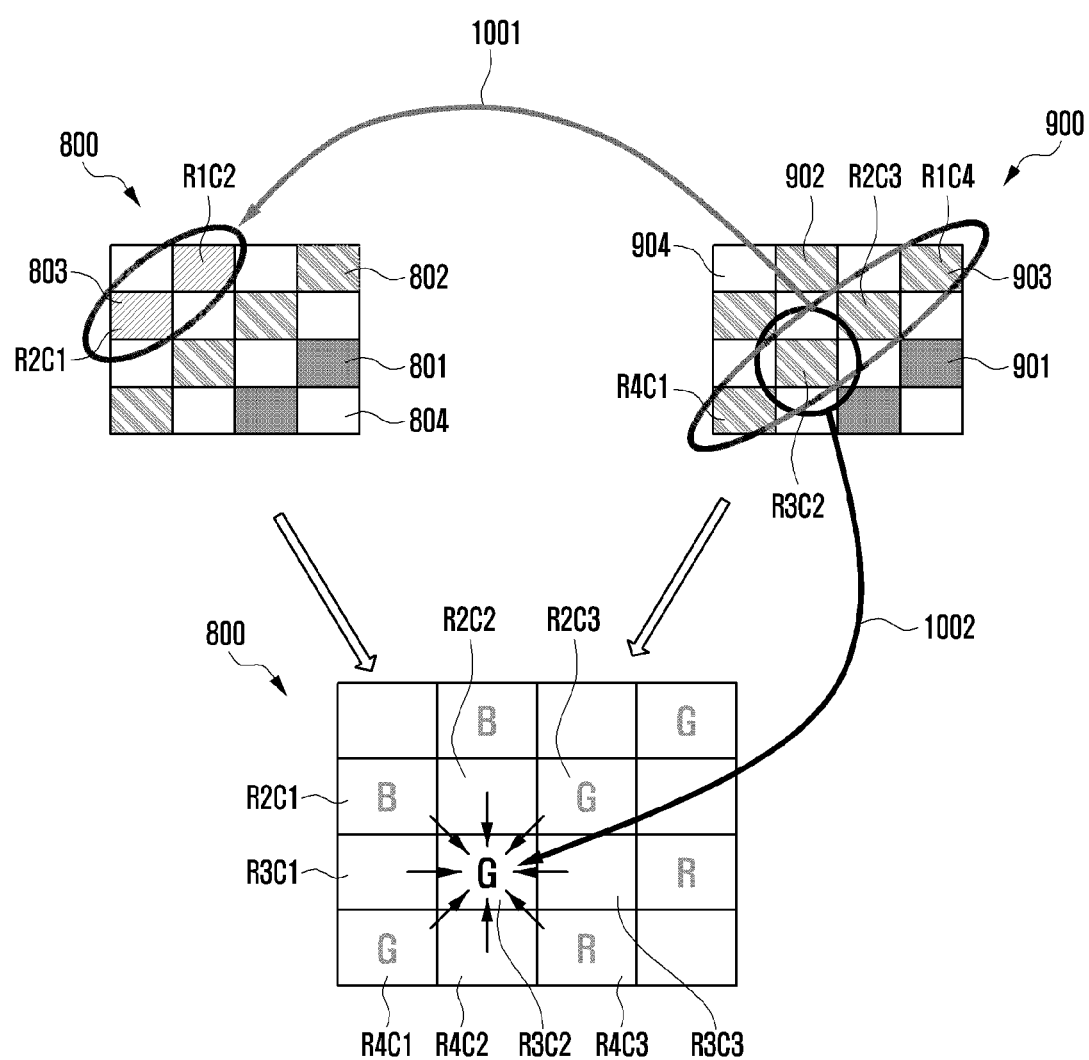
FIG. 10 illustrates a method in which an electronic device processes a first Bayer image obtained through a first image sensor module and a second Bayer image obtained through a second image sensor module according to an embodiment.

FIG. 10 illustrates a method in which an electronic device 700 processes a first Bayer image obtained through a first image sensor module 711 and a second Bayer image obtained through a second image sensor module 712 according to an embodiment.

In FIG. 10, an arrow 1001 may indicate a method of replacing the first Bayer image obtained through the first image sensor module 711 based on the second Bayer image obtained through the second image sensor module 712.

In FIG. 10, an arrow 1002 may indicate a method of interpolating the first Bayer image obtained through the first image sensor module 711 and the second Bayer image obtained through the second image sensor module 712.

Referring to the arrow 1001 of FIG. 10, a replacing module 740 according to an embodiment may change information (or value) of a first blue component included in the first Bayer image, based on information (or value) of a second blue component included in the second Bayer image. For example, the replacing module 740 may replace (or substitute) the information (or value) of the first blue component included in the first Bayer image with the information (or value) of the second blue component included in the second Bayer image.

According to an embodiment, the replacing module 740 may obtain pieces of information (or values) of the second blue component from a first row and fourth column R1C4, a second row and third column R2C3, a third row and second column R3C2, and a fourth row and first column R4C1 of the second color filter array 900, and may merge the obtained pieces of information of the second blue component. According to an embodiment, the replacing module 740 may average the obtained values of the second blue component, and may replace the information (or value) of the first blue component included in the first Bayer image with the averaged value of the second blue component. For example, the replacing module 740 may replace the values of the first blue component from a first row and second column R1C2 and a second row and first column R2C1 of the first color filter array 800 with the averaged value of the second blue component.

The electronic device 700 according to various embodiments may increase the number of blue pixels by changing the color filter array of the second image sensor module 712, thereby increasing the receiving amount of light of the blue component. The electronic device 700 according to various embodiments may increase the SNR of a raw image obtained through UDC with respect to the blue color. Although a dynamic range for one blue pixel included in a color filter array is fixed, the number of blue pixels (or blue channels) in the second color filter array 900 is doubled compared to the number of blue pixels in the first color filter array 800, and thus the SNR with respect to the blue color may be improved.

The electronic device 700 according to various embodiments may employ one camera module 600, that is, one image sensor 630, and may include an embodiment using a method for generating a final image through image synthesis using a plurality of image sensors 630 in order to reduce a difference between an image having a large number of blue channels and an image obtained through a conventional color filter array (e.g., the first color filter array 800).

The electronic device 700 according to various embodiments may improve the SNR of a signal in a short wavelength region including the blue color in a poor light-receiving environment, such as UDC. The electronic device 700 according to various embodiments may improve image quality by synthesizing images obtained through at least one second image sensor module 712 in which the structure of a color filter array is changed to supplement low light transmittance at a short wavelength and the conventional color filter array (e.g., the first color filter array 800) for correcting a color imbalance in an image due to the changed structure.

Referring to the arrow 1002 of FIG. 10, an interpolation module 730 according to an embodiment may perform color interpolating (e.g., color interpolation) on the first Bayer image and the second Bayer image. According to an embodiment, the interpolation module 730 may perform a color interpolation function for a specific pixel using a correlation between the specific pixel and pixels adjacent to the specific pixel. For example, the interpolation module 730 may perform interpolation processing on a first green pixel 802 corresponding to a green channel in the first Bayer image.

For example, in interpolating information (or value) of a first green component of a first green pixel 802 at a third row and second column R3C2 of the first color filter array 800, the interpolation module 730 may refer to color information obtained from each of pixels at a second row and second column R2C2, a second row and first column R2C1, a third row and first column R3C1, a fourth row and first column R4C1, a fourth row and second column R4C2, a fourth row and third column R4C3, a third row and third column R3C3, and a second raw and third column R2C3, which are positioned adjacent to the third row and second column R3C2, and the color information obtained from the pixel at the third row and second column R3C2 itself in the first color filter array 800.

According to an embodiment, in performing color interpolation of the first Bayer image, the interpolation module 730 may not only use a correlation between a specific pixel of the first color filter array 800 and pixels adjacent to the specific pixel, but may also refer to color information obtained through a specific pixel of the second color filter array 900 corresponding to the coordinates of the specific pixel. For example, in interpolating the information (or value) of the first green component of the first green pixel 802 at the third row and second column R3C2 of the first color filter array 800, the interpolation module 730 may refer information (or value) of a second blue component of a second blue pixel 903 at a third row and second column R3C2 of the second color filter array 900. The electronic device 700 according to an embodiment may perform more accurate color calculation, thereby improving image quality.

Figure 11:
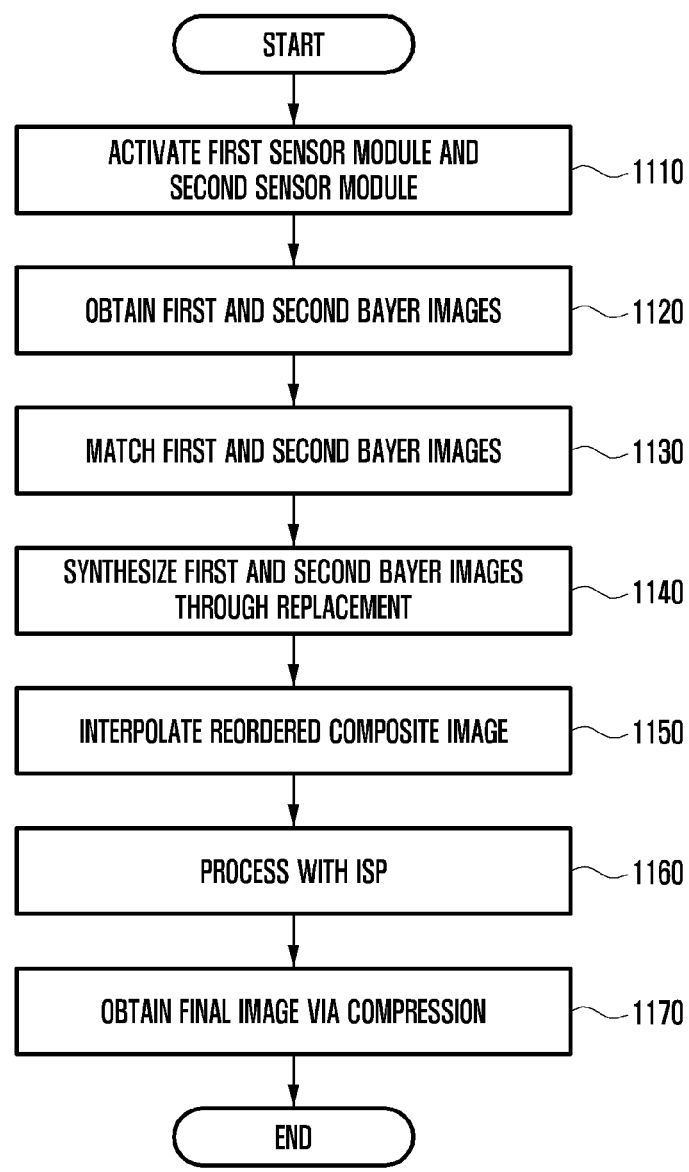
FIG. 11 is a flowchart illustrating an operation of an electronic device according to an embodiment.

FIG. 11 is a flowchart illustrating an operation of an electronic device 700 according to an embodiment.

At least some of operations shown in FIG. 11 may be omitted. At least some operations mentioned with reference to other drawings in the disclosure may be additionally inserted before or after at least some of the operations shown in FIG. 11.

The operations shown in FIG. 11 may be performed by a processor 760 (e.g., the processor 760 of FIG. 7). For example, a memory 650 (e.g., the memory 650 of FIG. 7) of the electronic device 700 may store instructions that, when executed, cause the processor 760 to perform at least some of the operations shown in FIG. 11.

In operation 1110, the electronic device 700 according to an embodiment may activate a first image sensor module 711 and a second image sensor module 712, based on a request to activate a camera module 600, for example, a UDC, disposed to partially overlap with a display 101. According to an embodiment, the request to activate the UDC may include execution of a camera application or a user input, but various embodiments of the disclosure may not be limited thereto.

According to an embodiment, the first image sensor module 711 may include a first color filter array 800 including an RGBW Bayer filter or an RGB Bayer filter.

According to an embodiment, the first color filter array 800 of the first image sensor module 711 may have a pixel size of n*m (n and m are natural numbers).

According to an embodiment, the first color filter array 800 may include at least one first red pixel 801, at least one first green pixel 802, and at least one first blue pixel 803, and in the first color filter array 800, the proportion of first green pixels 802 may be greater than the proportion of first blue pixels 803. For example, in the first color filter array 800, the proportion of the first blue pixels 803 may be about 12.5%, and the proportion of the first green pixels 802 may be about 25%. According to an embodiment, the first color filter array 800 may further include at least one first white pixel 804.

According to an embodiment, the second image sensor module 712 may include a second color filter array 900 including an RGBW Bayer filter or an RGB Bayer filter.

According to an embodiment, the second color filter array 900 of the second image sensor module 712 may have a pixel size of n*m (n and m are natural numbers).

According to an embodiment, the pixel size of the second color filter array 900 of the second image sensor module 712 may be the same as the pixel size of the first color filter array 800 of the first image sensor module 711. For example, the pixel sizes of the first color filter array 800 and the second color filter array 900 may equally be 4*4.

According to an embodiment, the second color filter array 900 may include at least one second red pixel 901, at least one second green pixel 902, and at least one second blue pixel 903, and in the second color filter array 900, the proportion of second blue pixels 903 may be greater than the proportion of the second green pixels 902. For example, in the second color filter array 900, the proportions of the second blue pixels 903 may be about 25%, and the proportion of the second green pixels 902 may be about 12.5%.

According to an embodiment, the proportion (e.g., about 25%) of the second blue pixels 903 in the second color filter array 900 may be greater than the proportion (e.g., about 12.5%) of the first blue pixels 803 in the first color filter array 800.

According to an embodiment, the second color filter array 900 may further include at least one second white pixel 904.

In operation 1120, the electronic device 700 according to an embodiment may obtain a first Bayer image through the first image sensor module 711, and may obtain a second Bayer image through the second image sensor module 712.

According to an embodiment, the first Bayer image may be an image filtered through the first color filter array 800 of the first image sensor module 711. The first Bayer image may be referred to as a "first Bayer pattern image" or a "first raw image".

According to an embodiment, the second Bayer image may be an image filtered through the second color filter array 900 of the second image sensor module 712. The second Bayer image may be referred to as a "second Bayer pattern image" or a "second raw image".

In operation 1130, the electronic device 700 according to an embodiment may match the first Bayer image and the second Bayer image.

According to an embodiment, a matching module 720 may perform an operation of matching the angle of view of the first Bayer image with the angle of view of the second Bayer image. For example, the first image sensor module 711 and the second image sensor module 712 may be disposed to be physically spaced apart from each other. Accordingly, the angle of view of the first Bayer image generated by the first image sensor module 711 and the angle of view of the second Bayer image generated by the second image sensor module 712 may be different. According to an embodiment, the matching module 720 may determine a common area of the first Bayer image and the second Bayer image (or a common area of the first corrected image and the second corrected image), and may match at least one object included in the common area to the same view point.

According to an embodiment, the matching module 720 may use a compensation algorithm for correcting a positional difference between blue components of the first Bayer image and the second Bayer image based on the positions of the first blue pixels 803 of the first color filter array 800 and the positions of the second blue pixel 903 of the second color filter array 900 being different.

In operation 1140, the electronic device 700 according to an embodiment may generate one synthesized image through replacing of the first Bayer image based on the second Bayer image.

According to an embodiment, a replacing module 740 may change information (or value) of the blue components included in the first Bayer image, based on information (or value) of the blue components included in the second Bayer image, thereby generating one synthesized image (e.g., a composite image). For example, the replacing module 740 may replace (or substitute) the information (or value) of the blue components included in the first Bayer image with the information (or value) of the blue components included in the second Bayer image. According to an embodiment, the second Bayer image may have a signal-to-noise ratio (SNR) for the blue color higher than the SNR of the first Bayer image. According to an embodiment, the replacing module 740 may replace the information (or value) of the blue components included in the first Bayer image with the information of the blue components included in the second Bayer image, thereby generating the composite image with an improved SNR.

In operation 1150, the electronic device 700 according to an embodiment may interpolate the reordered composite image. According to an embodiment, an interpolation module 730 may perform color interpolating (e.g., color interpolation) on the composite image obtained by synthesizing the first Bayer image and the second Bayer image. According to an embodiment, the interpolation module 730 may perform a color interpolation function for a specific pixel using a correlation between the specific pixel and pixels adjacent to the specific pixel. In various embodiments of the disclosure, a color interpolation method may not be limited to a specific method.

In operation 1160, the electronic device 700 according to an embodiment may perform one or more types of image processing on the interpolated composite image, thereby generating a corrected image. For example, an ISP 660 may receive one interpolated composite image interpolated by the interpolation module 730, and may perform at least one type of image processing on the received composite image, thereby generating a corrected image.

According to an embodiment, the one or more types of image processing may include, for example, depth map generation, 3D modeling, panorama generation, feature point extraction, image synthesis, or image compensation (e.g., noise reduction, resolution adjustment, brightness adjustment, blurring, sharpening, or softening). According to an embodiment, although the corrected image generated by the ISP 660 may have, for example, a JPEG format or a YUV format, those skilled in the art will readily understand that there is no limitation on the format of the corrected image. The ISP 660 may store the corrected image in the memory 650 (e.g., a VRAM), and the processor 760 may display the corrected image through the display 101. According to an embodiment, the ISP 660 may transmit the corrected image to a compression module 750.

In operation 1170, the electronic device 700 according to an embodiment may compress the corrected image processed by the ISP 660, thereby obtaining a final image (e.g., a third image).

According to an embodiment, the compression module 750 may compress the corrected image generated by the ISP 660 to generate the final image (e.g., the third image), and may store the final image in the memory 650. According to an embodiment, the compression module 750 may compress the corrected image, for example, by a method defined in the JPEG format, and those skilled in the art will readily understand that there is no limitation on a compression method.

Figure 12:
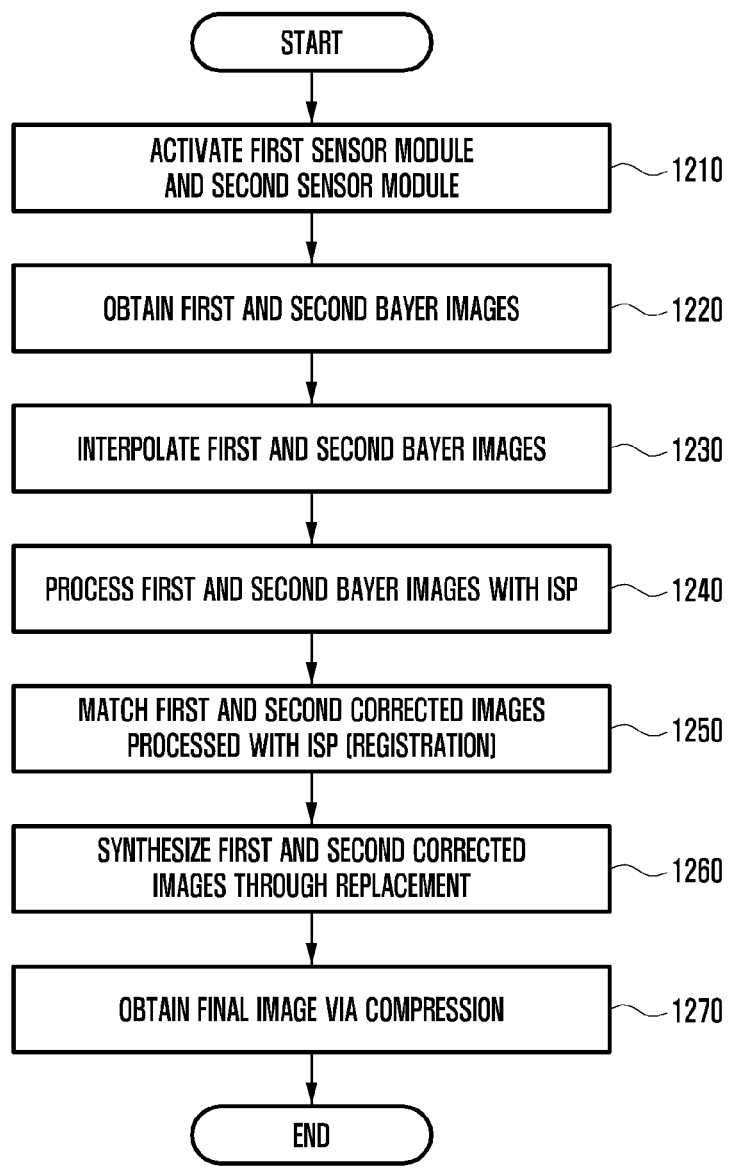
FIG. 12 is a flowchart illustrating an operation of an electronic device according to another embodiment.

FIG. 12 is a flowchart illustrating an operation of an electronic device 700 according to another embodiment.

At least some of operations shown in FIG. 12 may be omitted. At least some operations mentioned with reference to other drawings in the disclosure may be additionally inserted before or after at least some of the operations shown in FIG. 12.

The operations shown in FIG. 12 may be performed by a processor 760 (e.g., the processor 760 of FIG. 7). For example, a memory 650 (e.g., the memory 650 of FIG. 7) of the electronic device 700 may store instructions that, when executed, cause the processor 760 to perform at least some of the operations shown in FIG. 12.

In the operation of the electronic device 700 according to the embodiment shown in FIG. 12, unlike in the operation of the electronic device 700 according to the embodiment shown in FIG. 11, the electronic device 700 may first perform interpolation and processing by an ISP 600 on each of a first Bayer image and a second Bayer image, and may then synthesize the first Bayer image and the second Bayer image into one composite image. In the operation of the electronic device 700 according to the embodiment shown in FIG. 12, images of different exposures may be generated by differently configuring exposures of a plurality of image sensor modules, and may be used for a high dynamic range (HDR) effect. For example, the electronic device 700 according to the embodiment shown in FIG. 11 first generates one composite image by synthesizing the first Bayer image and the second Bayer image and then performs processing by the ISP 660, while the electronic device 700 according to the embodiment shown in FIG. 12 first performs interpolation and processing by the ISP 660 on each of the first Bayer image and the second Bayer image and then synthesize the first Bayer image and the second Bayer image into one composite image, thus making it possible to configure exposure for each of the plurality of images. The electronic device 700 according to the embodiment shown in FIG. 12 may perform a synthesis process of partially replacing a relatively noisy dark portion or a low-illuminance portion of the first Bayer image with information of the second Bayer image, thereby improving the SNR of the final image.

In operation 1210, the electronic device 700 according to an embodiment may activate a first image sensor module 711 and a second image sensor module 712, based on a request to activate a camera module 600, for example, a UDC, disposed to partially overlap with a display 101. According to an embodiment, the request to activate the UDC may include execution of a camera application or a user input, but various embodiments of the disclosure may not be limited thereto.

According to an embodiment, the first image sensor module 711 may include a first color filter array 800 including an RGBW Bayer filter or an RGB Bayer filter.

According to an embodiment, the first color filter array 800 of the first image sensor module 711 may have a pixel size of n*m (n and m are natural numbers).

According to an embodiment, the first color filter array 800 may include at least one first red pixel 801, at least one first green pixel 802, and at least one first blue pixel 803, and in the first color filter array 800, the proportion of first green pixels 802 may be greater than the proportion of first blue pixels 803. For example, in the first color filter array 800, the proportion of the first blue pixels 803 may be about 12.5%, and the proportion of the first green pixels 802 may be about 25%. According to an embodiment, the first color filter array 800 may further include at least one first white pixel 804.

According to an embodiment, the second image sensor module 712 may include a second color filter array 900 including an RGBW Bayer filter or an RGB Bayer filter.

According to an embodiment, the second color filter array 900 of the second image sensor module 712 may have a pixel size of n*m (n and m are natural numbers).

According to an embodiment, the pixel size of the second color filter array 900 of the second image sensor module 712 may be the same as the pixel size of the first color filter array 800 of the first image sensor module 711. For example, the pixel sizes of the first color filter array 800 and the second color filter array 900 may equally be 4*4.

According to an embodiment, the second color filter array 900 may include at least one second red pixel 901, at least one second green pixel 902, and at least one second blue pixel 903, and in the second color filter array 900, the proportion of second blue pixels 903 may be greater than the proportion of the second green pixels 902. For example, in the second color filter array 900, the proportions of the second blue pixels 903 may be about 25%, and the proportion of the second green pixels 902 may be about 12.5%.

According to an embodiment, the proportion (e.g., about 25%) of the second blue pixels 903 in the second color filter array 900 may be greater than the proportion (e.g., about 12.5%) of the first blue pixels 803 in the first color filter array 800.

According to an embodiment, the second color filter array 900 may further include at least one second white pixel 904.

In operation 1220, the electronic device 700 according to an embodiment may obtain a first Bayer image through the first image sensor module 711, and may obtain a second Bayer image through the second image sensor module 712.

According to an embodiment, the first Bayer image may be an image filtered through the first color filter array 800 of the first image sensor module 711. The first Bayer image may be referred to as a "first Bayer pattern image" or a "first raw image".

According to an embodiment, the second Bayer image may be an image filtered through the second color filter array 900 of the second image sensor module 712. The second Bayer image may be referred to as a "second Bayer pattern image" or a "second raw image".

In operation 1230, the electronic device 700 according to an embodiment may interpolate each the first Bayer image and the second Bayer image. According to an embodiment, an interpolation module may perform color interpolating (e.g., color interpolation) on each of the first Bayer image and the second Bayer image. According to an embodiment, the interpolation module 730 may perform a color interpolation function for a specific pixel using a correlation between the specific pixel and pixels adjacent to the specific pixel. In various embodiments of the disclosure, a color interpolation method may not be limited to a specific method.

According to an embodiment, the electronic device 700 may perform color interpolation on the first Bayer image, based on a first weight, and may perform color interpolation on the second Bayer image, based on a second weight different from the first weight. For example, the first color filter array 800 and the second color filter array 900 may have different configurations of color pixels, and accordingly a weight for each color required for color interpolation may also be differently configured for each of the first and second Bayer images.

In operation 1240, the electronic device 700 according to an embodiment may perform image processing (or processing by the ISP 660) on each of the first Bayer image and the second Bayer image. According to an embodiment, the ISP 660 may perform at least one type of image processing on the first Bayer image and the second Bayer image, thereby generating a first corrected image and a second corrected image.

According to an embodiment, the one or more types of image processing may include, for example, depth map generation, 3D modeling, panorama generation, feature point extraction, image synthesis, or image compensation (e.g., noise reduction, resolution adjustment, brightness adjustment, blurring, sharpening, or softening). According to an embodiment, although the corrected image generated by the ISP 660 may have, for example, a JPEG format or a YUV format, those skilled in the art will readily understand that there is no limitation on the format of the corrected image.

In operation 1250, the electronic device 700 according to an embodiment may match the first corrected image and the second corrected image.

According to an embodiment, a matching module 720 may perform an operation of matching the angle of view of the first corrected image with the angle of view of the second corrected image. According to an embodiment, the matching module 720 may determine a common area of the first corrected image and the second corrected image, and may match at least one object included in the common area to the same view point.

According to an embodiment, the matching module 720 may use a compensation algorithm for correcting a positional difference between blue components of the first corrected image and the second corrected image based on the positions of the first blue pixels 803 of the first color filter array 800 and the positions of the second blue pixel 903 of the second color filter array 900 being different.

In operation 1260, the electronic device 700 according to an embodiment may generate one synthesized image through replacing of the first corrected image based on the second corrected image.

According to an embodiment, a replacing module 740 may change information (or value) of the blue components included in the first corrected image, based on information (or value) of the blue components included in the second corrected image, thereby generating one synthesized image (e.g., a composite image). For example, the replacing module 740 may replace (or substitute) the information (or value) of the blue components included in the first corrected image with the information (or value) of the blue components included in the second corrected image. According to an embodiment, the second corrected image may have a signal-to-noise ratio (SNR) for the blue color higher than the SNR of the first corrected image. According to an embodiment, the replacing module 740 may replace the information (or value) of the blue components included in the first corrected image with the information of the blue components included in the second corrected image, thereby generating the composite image with an improved SNR.

In operation 1270, the electronic device 700 according to an embodiment may compress the composite image, thereby obtaining a final image (e.g., a third image).

According to an embodiment, a compression module 750 may compress the composite image synthesized by the replacing module 740 to generate the final image (e.g., the third image), and may store the final image in the memory 650. According to an embodiment, the compression module 750 may compress the composite image, for example, by a method defined in the JPEG format, and those skilled in the art will readily understand that there is no limitation on a compression method.

An electronic device (e.g., the electronic device 100 of FIG. 1) according to various embodiments may include a display (e.g., the display 101 of FIG. 1), a camera module (e.g., the camera module 600 of FIG. 7) disposed to overlap at least a portion of the display 101 and including at least one first image sensor module (e.g., the first image sensor module 711 of FIG. 7) to generate a first Bayer image processed by a first color filter array (e.g., the first color filter array 800 of FIG. 8) and at least one second image sensor module (e.g., the second image sensor module 712 of FIG. 7) to generate a second Bayer image processed by a second color filter array (e.g., the second color filter array 900 of FIG. 9), and a processor (e.g., the processor 760 of FIG. 7), where the first color filter array 800 may include at least one first red pixel 801, at least one first green pixel 802, and at least one first blue pixel 803, the second color filter array 900 may include at least one second red pixel 901, at least one second green pixel 902, and at least one second blue pixel 903, and a proportion of second blue pixels 903 in the second color filter array 900 may be greater than a proportion of first blue pixels 803 in the first color filter array 800.

According to an embodiment, a proportion of first green pixels 802 in the first color filter array 800 may be greater than the proportion of the first blue pixels 803 in the first color filter array 800, and a proportion of second blue pixels 903 in the second color filter array 900 may be greater than a proportion of second green pixels 902 in the second color filter array 900.

According to an embodiment, a pixel size of the first color filter array 800 may be the same as a pixel size of the second color filter array 900.

According to an embodiment, the first color filter array 800 may further include at least one first white pixel, and the second color filter array 900 may further include at least one second white pixel.

According to an embodiment, the processor 760 may activate the first image sensor module 711 and the second image sensor module 712, based on a request to activate the camera module 600, may obtain the first Bayer image through the first image sensor module 711 and the second Bayer image through the second image sensor module 712, may perform a matching operation of matching an angle of view of the first Bayer image and an angle of view of the second Bayer image, may generate one synthesized composite image by changing values of a blue component included in the first Bayer image, based on values of a blue component included in the second Bayer image, may perform color interpolation on the composite image, may generate a corrected image by performing at least one type of image processing on the interpolated image, and may generate a third image by compressing the corrected image.

According to an embodiment, the processor 760 may calculate an average of the values of the blue component included in the second Bayer image, and may change the values of the blue component included in the first Bayer image, based on the calculated average.

According to an embodiment, the processor 760 may activate the first image sensor module 711 and the second image sensor module 712, based on a request to activate the camera module 600, may obtain the first Bayer image through the first image sensor module 711 and the second Bayer image through the second image sensor module 712, may perform color interpolation on the first Bayer image and the second Bayer image, may generate a first corrected image and a second corrected image by performing at least one type of image processing on the interpolated first Bayer image and the interpolated second Bayer image, may perform a matching operation of matching an angle of view of the first corrected image and an angle of view of the second corrected image, may generate one synthesized composite image by changing values of a blue component included in the first corrected image, based on values of a blue component included in the second corrected image, and may generate a third image by compressing the composite image.

According to an embodiment, the processor 760 may perform the color interpolation on the first Bayer image, based on a first weight, and may perform the color interpolation on the second Bayer image, based on a second weight different from the first weight.

In a method for an electronic device 100 according to various embodiments, the electronic device 100 may include a display 101 and a camera module 600 disposed to overlap at least a portion of the display 101 and including at least one first image sensor module 711 to generate a first Bayer image processed by a first color filter array 800 and at least one second image sensor module 712 to generate a second Bayer image processed by a second color filter array 900, the first color filter array 800 may include at least one first red pixel 801, at least one first green pixel 802, and at least one first blue pixel 803, the second color filter array 900 may include at least one second red pixel 901, at least one second green pixel 902, and at least one second blue pixel 903, and a proportion of second blue pixels 903 in the second color filter array 900 may be greater than a proportion of first blue pixels 803 in the first color filter array 800, and the method may include activating the first image sensor module 711 and the second image sensor module 712, based on a request to activate the camera module 600, and obtaining the first Bayer image through the first image sensor module 711 and the second Bayer image through the second image sensor module 712.

According to an embodiment, the method may further include performing a matching operation of matching an angle of view of the first Bayer image and an angle of view of the second Bayer image, generating one synthesized composite image by changing values of a blue component included in the first Bayer image, based on values of a blue component included in the second Bayer image, performing color interpolation on the composite image, generating a corrected image by performing at least one type of image processing on the interpolated image, and generating a third image by compressing the corrected image.

According to an embodiment, the generating of the composite image may include calculating an average of the values of the blue component included in the second Bayer image, and changing the values of the blue component included in the first Bayer image, based on the calculated average.

According to an embodiment, the method may further include performing color interpolation on the first Bayer image and the second Bayer image, generating a first corrected image and a second corrected image by performing at least one type of image processing on the first Bayer image and the second Bayer image, performing a matching operation of matching an angle of view of the first corrected image and an angle of view of the second corrected image, generating one synthesized composite image by changing values of a blue component included in the first corrected image, based on values of a blue component included in the second corrected image, and generating a third image by compressing the composite image.

According to an embodiment, the performing of the color interpolation may include performing the color interpolation on the first Bayer image, based on a first weight, and performing the color interpolation on the second Bayer image, based on a second weight different from the first weight.

According to an embodiment, a proportion of first green pixels 802 in the first color filter array 800 may be greater than the proportion of the first blue pixels 803, and a proportion of second blue pixels 903 in the second color filter array 900 may be greater than a proportion of second green pixels 902.

According to an embodiment, a pixel size of the first color filter array 800 may be the same as a pixel size of the second color filter array 900.

According to an embodiment, the first color filter array 800 may further include at least one first white pixel, and the second color filter array 900 may further include at least one second white pixel.

In a non-transitory computer-readable recoding medium recording a program to control an operation of an electronic device 100 according to various embodiments, the electronic device 100 may include a display 101 and a camera module 600 disposed to overlap at least a portion of the display 101 and including at least one first image sensor module 711 to generate a first Bayer image processed by a first color filter array 800 and at least one second image sensor module 712 to generate a second Bayer image processed by a second color filter array 900, wherein the first color filter array 800 may include at least one first red pixel 801, at least one first green pixel 802, and at least one first blue pixel 803, the second color filter array 900 may include at least one second red pixel 901, at least one second green pixel 902, and at least one second blue pixel 903, and a proportion of second blue pixels 903 in the second color filter array 900 may be greater than a proportion of first blue pixels 803 in the first color filter array 800, and the non-transitory computer-readable recoding medium may record a program to cause the electronic device 100 to perform an operation of activating the first image sensor module 711 and the second image sensor module 712, based on a request to activate the camera module 600, and an operation of obtaining the first Bayer image through the first image sensor module 711 and the second Bayer image through the second image sensor module 712, According to an embodiment, the non-transitory computer-readable recoding medium may record a program to cause the electronic device to further perform an operation of performing a matching operation of matching an angle of view of the first Bayer image and an angle of view of the second Bayer image, an operation of generating one synthesized composite image by changing values of a blue component included in the first Bayer image, based on values of a blue component included in the second Bayer image, an operation of performing color interpolation on the composite image, an operation of generating a corrected image by performing at least one type of image processing on the composite image, and an operation of generating a third image by compressing the corrected image.

According to an embodiment, the operation of generating the composite image may include an operation of calculating an average of the values of the blue component included in the second Bayer image, and an operation of changing the values of the blue component included in the first Bayer image, based on the calculated average.

According to an embodiment, the non-transitory computer-readable recoding medium may record a program to cause the electronic device to further perform an operation of performing color interpolation on the first Bayer image and the second Bayer image, an operation of generating a first corrected image and a second corrected image by performing at least one type of image processing on the first Bayer image and the second Bayer image, an operation of performing a matching operation of matching an angle of view of the first corrected image and an angle of view of the second corrected image, an operation of generating one synthesized composite image by changing values of a blue component included in the first corrected image, based on values of a blue component included in the second corrected image, and an operation of generating a third image by compressing the composite image.

According to an embodiment, the operation of performing the color interpolation may include an operation of performing the color interpolation on the first Bayer image, based on a first weight, and an operation of performing the color interpolation on the second Bayer image, based on a second weight different from the first weight.

According to an embodiment, a proportion of first green pixels 802 in the first color filter array 800 may be greater than the proportion of the first blue pixels 803, and a proportion of second blue pixels 903 in the second color filter array 900 may be greater than a proportion of second green pixels 902.

The invention claimed is:
1. An electronic device comprising:
a display;
a camera module disposed to overlap at least a portion of the display and comprising at least one first image sensor module to generate a first Bayer image processed by a first color filter array and at least one second image sensor module to generate a second Bayer image processed by a second color filter array; and
a processor,
wherein the first color filter array comprises at least one first red pixel, at least one first green pixel, and at least one first blue pixel,
wherein the second color filter array comprises at least one second red pixel, at least one second green pixel, and at least one second blue pixel, and
wherein a proportion of the least one second blue pixel in the second color filter array is greater than a proportion of the least one first blue pixel in the first color filter array.

2. The electronic device of claim 1, wherein a proportion of the least one first green pixel is greater than the proportion of the least one first blue pixel in the first color filter array, and
wherein a proportion of the least one second blue pixel is greater than a proportion of the least one second green pixel in the second color filter array.

3. The electronic device of claim 1, wherein a pixel size of the first color filter array is equal to a pixel size of the second color filter array.

4. The electronic device of claim 1, wherein the first color filter array further comprises at least one first white pixel, and
wherein the second color filter array further comprises at least one second white pixel.

5. The electronic device of claim 1, wherein the processor:
activates the at least one first image sensor module and the at least one second image sensor module, based on a request to activate the camera module,
obtains the first Bayer image through the at least one first image sensor module and the second Bayer image through the at least one second image sensor module,
performs a matching operation of matching an angle of view of the first Bayer image and an angle of view of the second Bayer image,
generates one synthesized composite image by changing values of a blue component in the first Bayer image, based on values of a blue component in the second Bayer image,
performs color interpolation on the composite image,
generates a corrected image by performing at least one type of image processing on the interpolated image, and
generates a third image by compressing the corrected image.

6. The electronic device of claim 5, wherein the processor:
calculates an average of the values of the blue component in the second Bayer image, and
changes the values of the blue component in the first Bayer image, based on the calculated average.

7. The electronic device of claim 1, wherein the processor:
activates the at least one first image sensor module and the at least one second image sensor module, based on a request to activate the camera module,
obtains the first Bayer image through the at least one first image sensor module and the second Bayer image through the at least one second image sensor module,
performs color interpolation on the first Bayer image and the second Bayer image,
generates a first corrected image and a second corrected image by performing at least one type of image processing on the interpolated first Bayer image and the interpolated second Bayer image,
performs a matching operation of matching an angle of view of the first corrected image and an angle of view of the second corrected image,
generates one synthesized composite image by changing values of a blue component in the first corrected image, based on values of a blue component in the second corrected image, and
generates a third image by compressing the composite image.

8. The electronic device of claim 7, wherein the processor:
performs the color interpolation on the first Bayer image, based on a first weight, and
performs the color interpolation on the second Bayer image, based on a second weight different from the first weight.

9. A method for operating an electronic device comprising a display and a camera module disposed to overlap at least a portion of the display and comprising at least one first image sensor module and at least one second image sensor module, the method comprising: activating the at least one first image sensor module and the at least one second image sensor module, based on a request to activate the camera module, and obtaining a first Bayer image through a first color filter array in the at least one first image sensor module and a second Bayer image through a second color filter array in the at least one second image sensor module, wherein the first color filter array comprises at least one first red pixel, at least one first green pixel, and at least one first blue pixel, the second color filter array comprises at least one second red pixel, at least one second green pixel, and at least one second blue pixel, and a proportion of the at least one second blue pixel in the second color filter array is greater than a proportion of the at least one first blue pixel in the first color filter array.

10. The method of claim 9, further comprising:
performing a matching operation of matching an angle of view of the first Bayer image and an angle of view of the second Bayer image,
generating one synthesized composite image by changing values of a blue component in the first Bayer image, based on values of a blue component in the second Bayer image,
performing color interpolation on the composite image,
generating a corrected image by performing at least one type of image processing on the interpolated image, and
generating a third image by compressing the corrected image.

11. The method of claim 10, wherein the generating of the composite image comprises:
calculating an average of the values of the blue component in the second Bayer image; and
changing the values of the blue component in the first Bayer image, based on the calculated average.

12. The method of claim 9, further comprising:
performing color interpolation on the first Bayer image and the second Bayer image;
generating a first corrected image and a second corrected image by performing at least one type of image processing on the first Bayer image and the second Bayer image;
performing a matching operation of matching an angle of view of the first corrected image and an angle of view of the second corrected image;
generating one synthesized composite image by changing values of a blue component in the first corrected image, based on values of a blue component in the second corrected image; and
generating a third image by compressing the composite image.

13. The method of claim 12, wherein the performing of the color interpolation comprises:
performing the color interpolation on the first Bayer image, based on a first weight; and
performing the color interpolation on the second Bayer image, based on a second weight different from the first weight.

14. The method of claim 9, wherein a pixel size of the first color filter array is equal to a pixel size of the second color filter array,
wherein a proportion of the at least one first green pixel in the first color filter array is greater than the proportion of the at least one first blue pixel, and
wherein a proportion of the at least one first blue pixel in the second color filter array is greater than a proportion of the at least one first green pixel.

15. The method of claim 9, wherein the first color filter array further comprises at least one first white pixel, and
wherein the second color filter array further comprises at least one second white pixel.

16. A non-transitory computer-readable recoding medium in which a program for controlling an operation of an electronic device is recorded, the electronic device comprising a display and a camera module disposed to overlap at least a portion of the display and comprising at least one first image sensor module and at least one second image sensor module, the program which causes the electronic device to perform: an operation of activating the at least one first image sensor module and the at least one second image sensor module, based on a request to activate the camera module; and an operation of obtaining a first Bayer image through a first color filter array in the at least one first image sensor module and a second Bayer image through a second color filter array in the at least one second image sensor module, wherein the first color filter array comprises at least one first red pixel, at least one first green pixel, and at least one first blue pixel, the second color filter array comprises at least one second red pixel, at least one second green pixel, and at least one second blue pixel, and a proportion of the at least one second blue pixel in the second color filter array is greater than a proportion of the at least one first blue pixel in the first color filter array.

17. The recoding medium of claim 16, wherein the program causes the electronic device to further perform:
an operation of performing a matching operation of matching an angle of view of the first Bayer image and an angle of view of the second Bayer image,
an operation of generating one synthesized composite image by changing values of a blue component in the first Bayer image, based on values of a blue component in the second Bayer image;
an operation of performing color interpolation on the composite image;
an operation of generating a corrected image by performing at least one type of image processing on the interpolated image; and
an operation of generating a third image by compressing the corrected image.

18. The recoding medium of claim 17, wherein the operation of generating the composite image comprises:
an operation of calculating an average of the values of the blue component in the second Bayer image; and
an operation of changing the values of the blue component in the first Bayer image, based on the calculated average.

19. The recoding medium of claim 16, wherein the program causes the electronic device to further perform:
an operation of performing color interpolation on the first Bayer image and the second Bayer image;
an operation of generating a first corrected image and a second corrected image by performing at least one type of image processing on the first Bayer image and the second Bayer image;
an operation of performing a matching operation of matching an angle of view of the first corrected image and an angle of view of the second corrected image;
an operation of generating one synthesized composite image by changing values of a blue component in the first corrected image, based on values of a blue component in the second corrected image; and
an operation of generating a third image by compressing the composite image.

20. The recoding medium of claim 19, wherein the operation of performing the color interpolation comprises:
an operation of performing the color interpolation on the first Bayer image, based on a first weight; and
an operation of performing the color interpolation on the second Bayer image, based on a second weight different from the first weight.

21. The recoding medium of claim 16, wherein a proportion of the at least one first green pixel in the first color filter array is greater than the proportion of the at least one first blue pixel, and
wherein a proportion of the at least one second blue pixel in the second color filter array is greater than a proportion of the at least one second green pixel.

* * * * *